United States Patent
Choi et al.

(10) Patent No.: US 12,512,224 B2
(45) Date of Patent: Dec. 30, 2025

(54) METHOD OF DISCOVERING DISEASE-RELEVANT MICROBIAL CONSORTIA USING MACHINE-LEARNING MODEL

(71) Applicant: IMMUNOBIOME INC., Pohang-si (KR)

(72) Inventors: Seung Yeon Choi, Pohang-si (KR); In Hae Kim, Pohang-si (KR); Jung Hwan Park, Pohang-si (KR); Ju Hun Lee, Pohang-si (KR)

(73) Assignee: IMMUNOBIOME INC., Pohang-si (KR)

( * ) Notice: Subject to any disclaimer, the term of this patent is extended or adjusted under 35 U.S.C. 154(b) by 72 days.

(21) Appl. No.: 18/537,992

(22) Filed: Dec. 13, 2023

(65) Prior Publication Data

US 2024/0203593 A1    Jun. 20, 2024

(30) Foreign Application Priority Data

Dec. 14, 2022    (KR) .................. 10-2022-0174923
Nov. 30, 2023    (KR) .................. 10-2023-0171560

(51) Int. Cl.
*G16H 50/20* (2018.01)
*G16B 20/00* (2019.01)
*G16B 40/20* (2019.01)

(52) U.S. Cl.
CPC ............. *G16H 50/20* (2018.01); *G16B 20/00* (2019.02); *G16B 40/20* (2019.02)

(58) Field of Classification Search
CPC ........ G16H 50/20; G16B 20/00; G16B 40/20; G16B 40/30; G16B 10/00
See application file for complete search history.

(56) References Cited

U.S. PATENT DOCUMENTS

2018/0200312 A1*    7/2018    Snijders ............... A61K 35/741

FOREIGN PATENT DOCUMENTS

| CN | 109852714 A | 6/2019 |
|---|---|---|
| CN | 115472214 A | 12/2022 |
| CN | 114854847 B | 8/2023 |
| EP | 3097211 B1 | 9/2023 |
| JP | 2020177518 A | 10/2020 |

OTHER PUBLICATIONS

Machine learning to predict microbial community functions: An analysis of dissolved organic carbon from litter decomposition (Year: 2019).*

(Continued)

*Primary Examiner* — Chinyere Mpamugo
(74) *Attorney, Agent, or Firm* — NKL Law; Jae Youn Kim

(57) ABSTRACT

The present invention aims to discover a microbial cluster that can be used when developing effective probiotics for a specific disease. Specifically, the invention includes (1) discovering a candidate microbial cluster data related to specific disease, which is collected by preprocessing a gut microbiota data (a taxonomy abundance table) and (2) training the machine learning model using the collected candidate microbial cluster data, and selecting a model with the highest predictive performance to discover a disease-microbial consortium.

22 Claims, 35 Drawing Sheets

(56) References Cited

OTHER PUBLICATIONS

Dan Knights et al. al., Human Associated Microbial Signatures: Examining Their Predictive Value, Cell Host & Microbe, vol. 20, Issue. 4, Oct. 20, 2011, pp. 292-296.

Vinod K. Gupta et al. A predictive index for health status using species level gut microbiome profiling . Nature Communications. 2020, Article No. 4635.

Ruixin Liu et al. Gut microbiome and serum metabolome alterations in obesity and after weight-loss intervention. Nature Medicine. 2017. vol. 23, pp. 859-868.

Emmanuelle Le Chatelier et al. Richness of human gut microbiome correlates with metabolic markers. Nature. 2023, vol. 500, pp. 541-546.

Zhuye Jie et al. The gut microbiome in atherosclerotic cardiovascular disease. Nature Communications. 2017. vol. 8, Article No. 845.

Francesco Beghini et al. Integrating taxonomic, functional, and strain level profiling of diverse microbial communities with bioBakery 3. eLife. 2021.

Brandilyn A. Peters et al. A taxonomic signature of obesity in a large study of American adults. Scientific Reports. 2018. vol. 8, Article No. 9749.

Elisa Martinez et al. Gut Microbiota Composition Associated with Clostridioides difficile Colonization and Infection. Pathogens. 2022. vol. 11, Article No. 781.

Jose U Scher et al. Expansion of intestinal Prevotella copri correlates with enhanced susceptibility to arthritis. eLIFE. 2013.

Huihui Xu et al. Interactions between Gut Microbiota and Immunomodulatory Cells in Rheumatoid Arthritis. Mediators of Inflammation. 2020. vol. 2020, Article ID 1430605.

Ting Zhao et al. Gut microbiota and rheumatoid arthritis: From pathogenesis to novel therapeutic opportunities. Frontiers in Immunology. 2022. vol. 13.

Alyxandria M. Schubert et al. Microbiome Data Distinguish Patients with Clostridium difficile Infection and Non-C. difficile-Associated Diarrhea from Healthy Controls. mBio. 2014. vol. 5.

\* cited by examiner

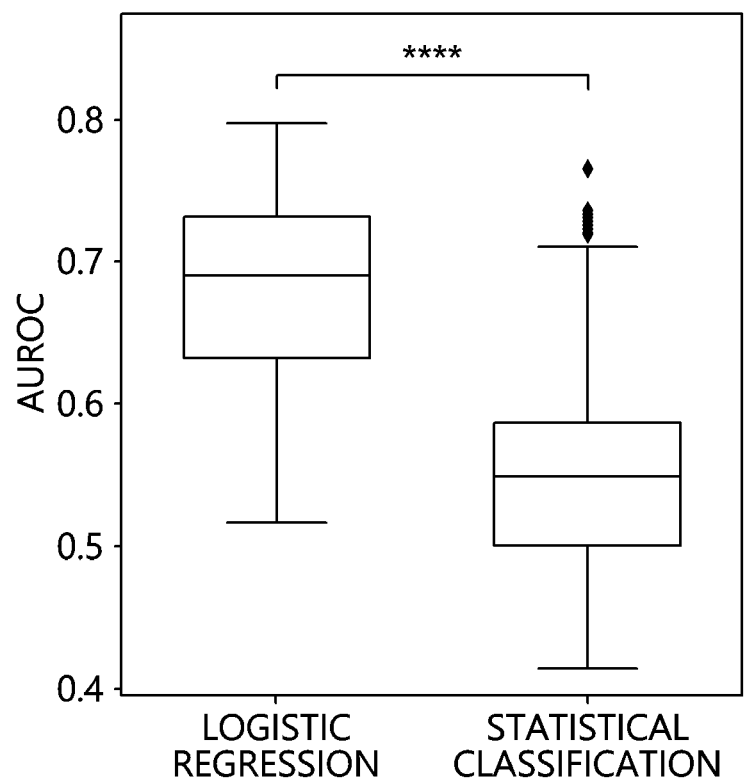

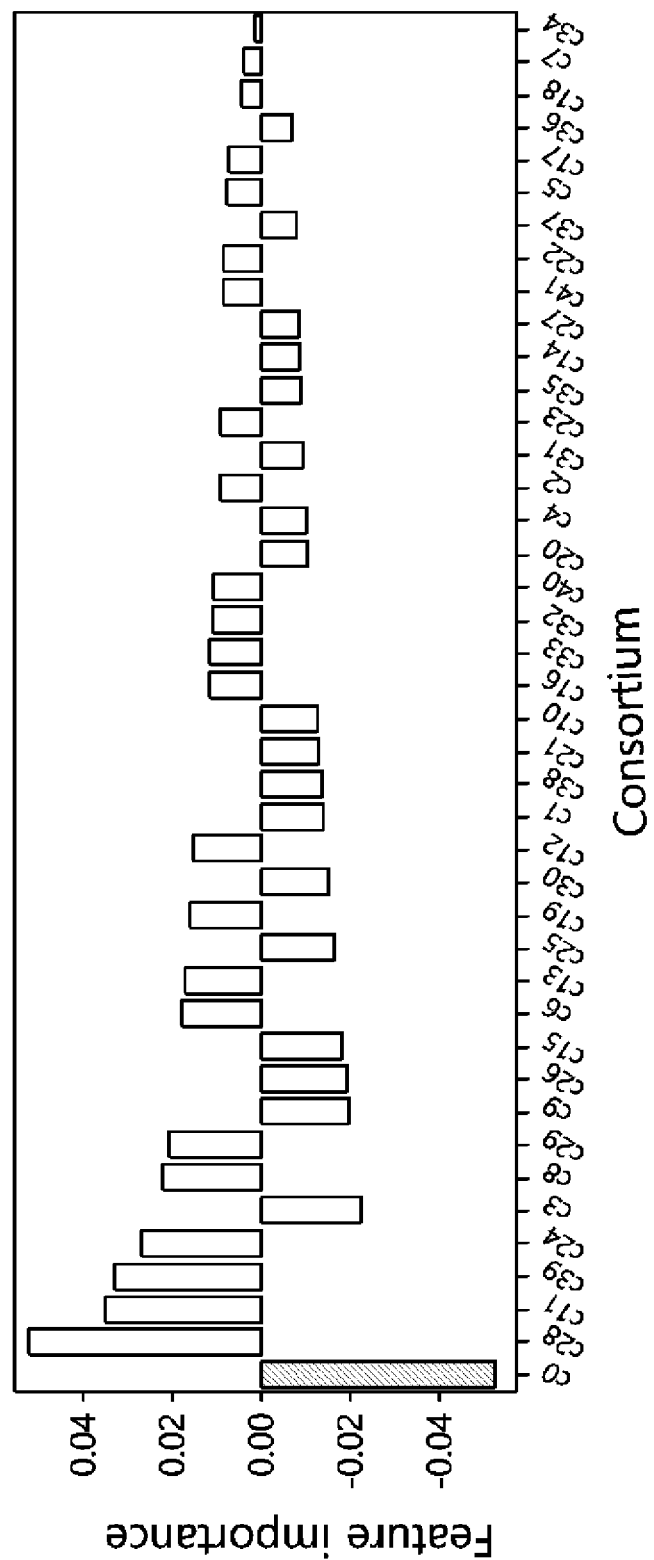

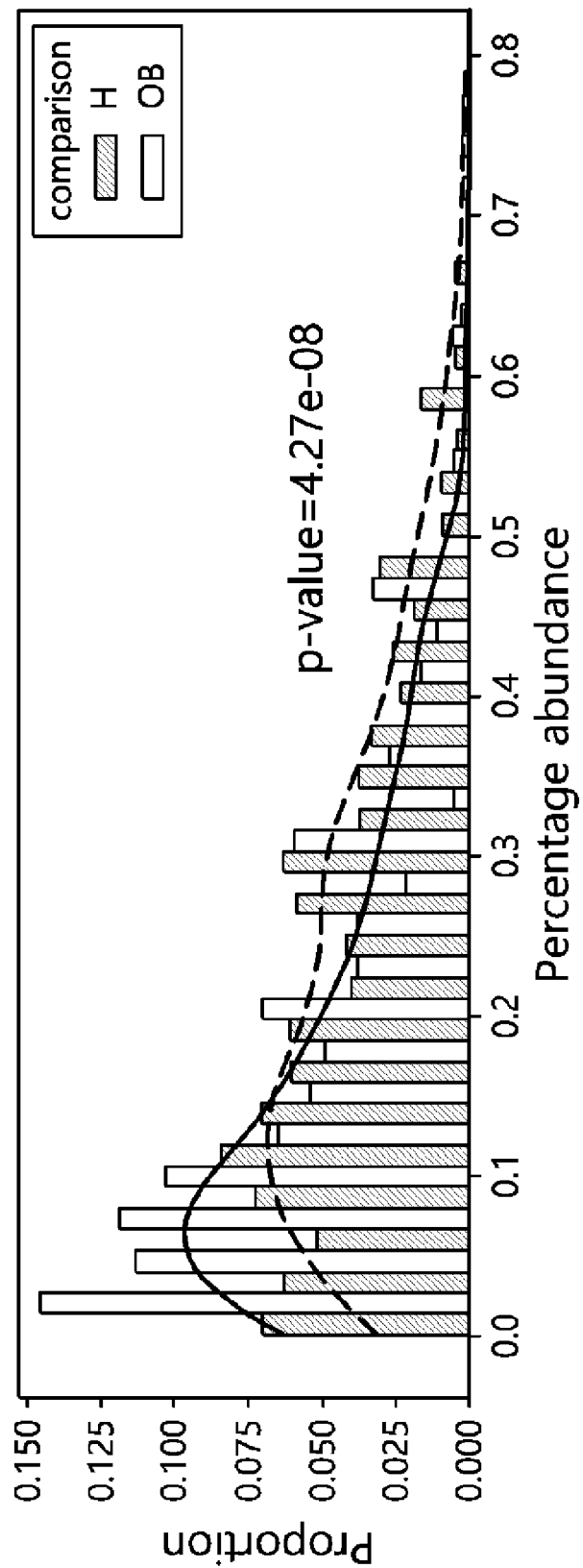

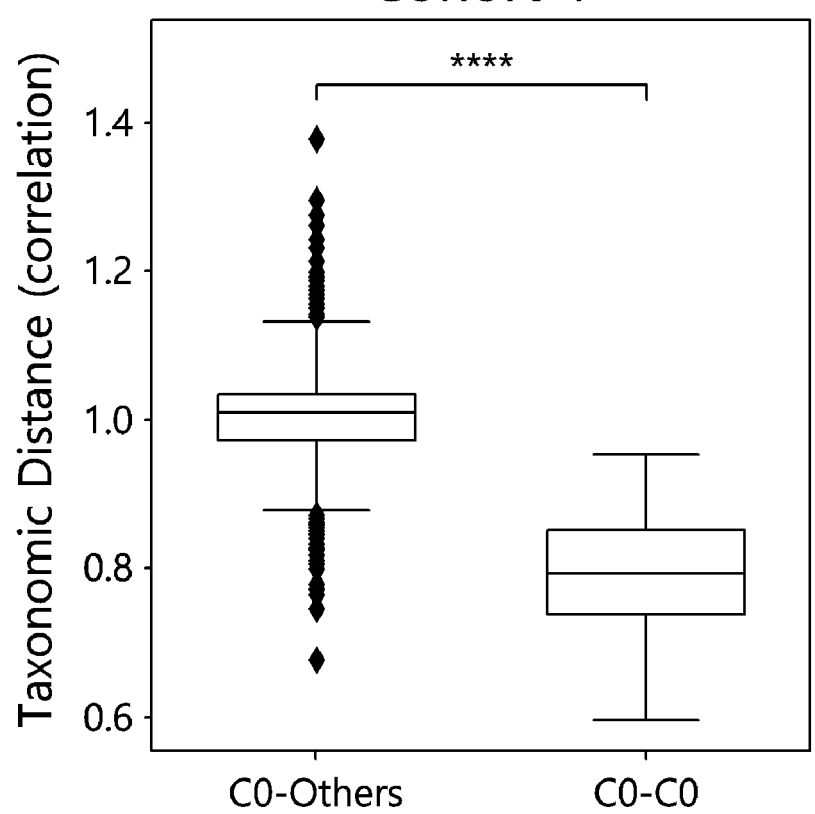

FIG. 8C

| Taxonomic similarity | Clustering for consortium generation | Best-performing ML algorithm | Best-performing ML model Performance (AUROC) |
|---|---|---|---|
| Correlation | GMM clustering ('covariance=full', 'Nclusters=22') | Random Forest ('max_depth=3') | 1.0 |

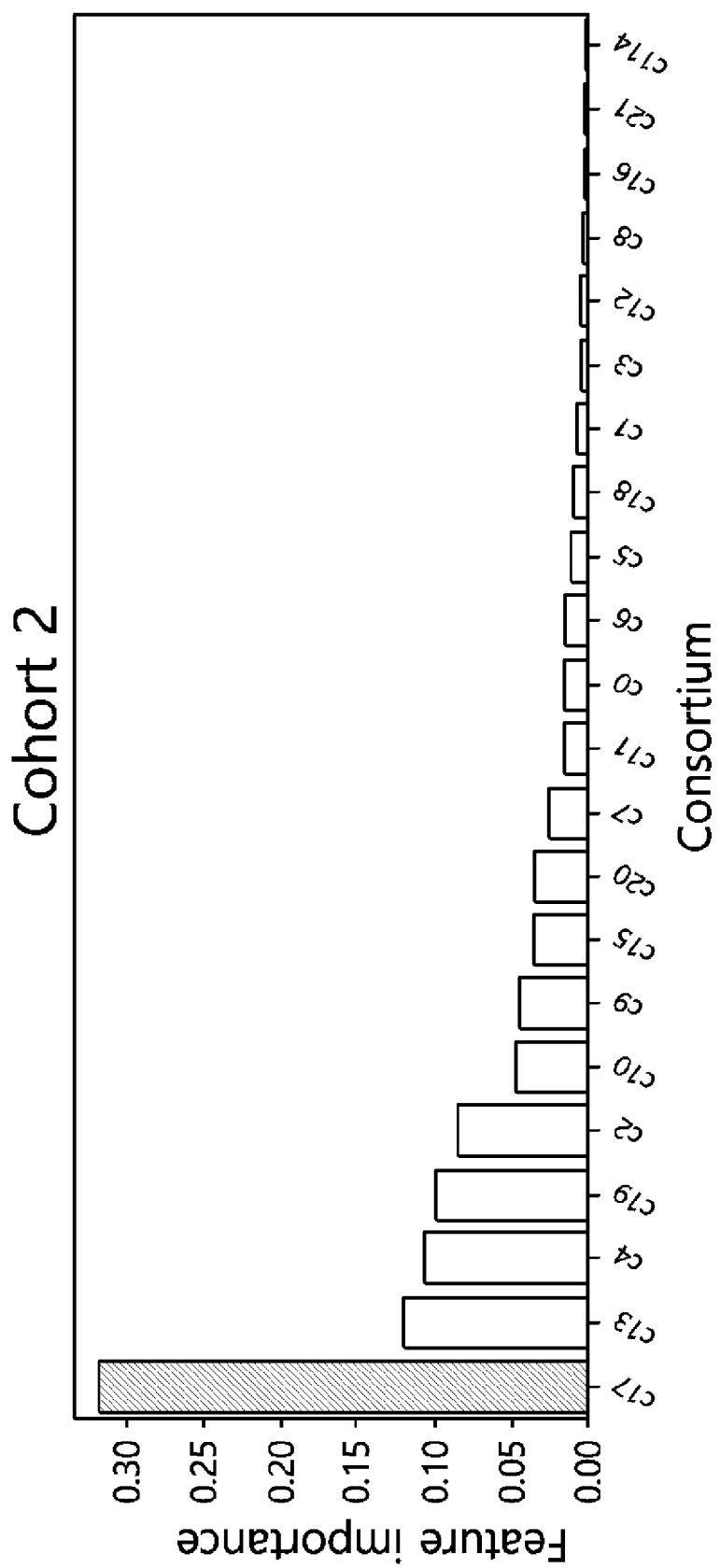

FIG. 11C

| Taxonomic similarity | Clustering for consortium generation | Best-performing ML algorithm | Best-performing ML model Performance (AUROC) |
|---|---|---|---|
| Dice | Kmeans clustering ('algorithms=full', 'Nclusters=22') | Logistic Regression ('penalty=l1','C=0.5') | 1.0 |

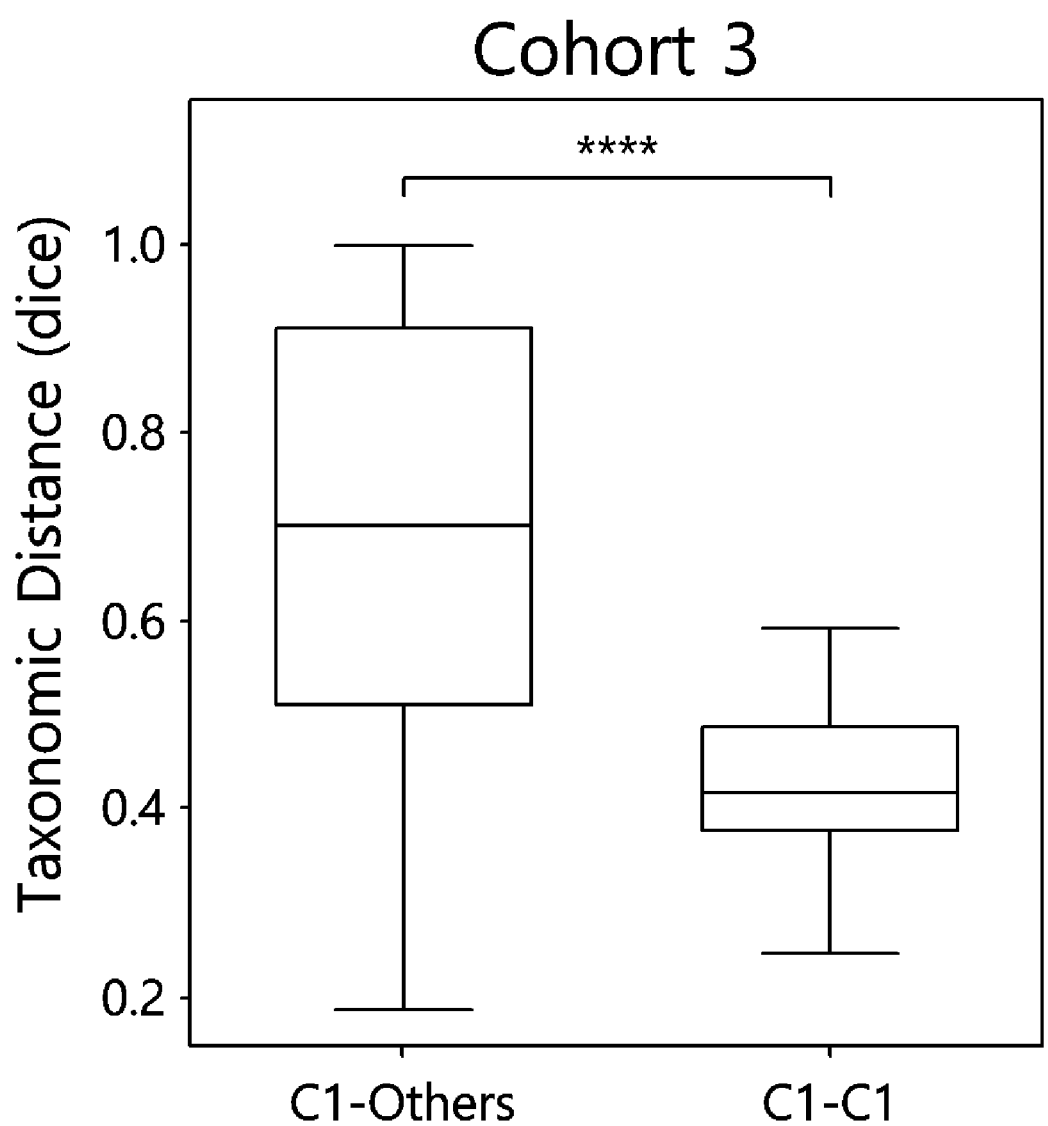

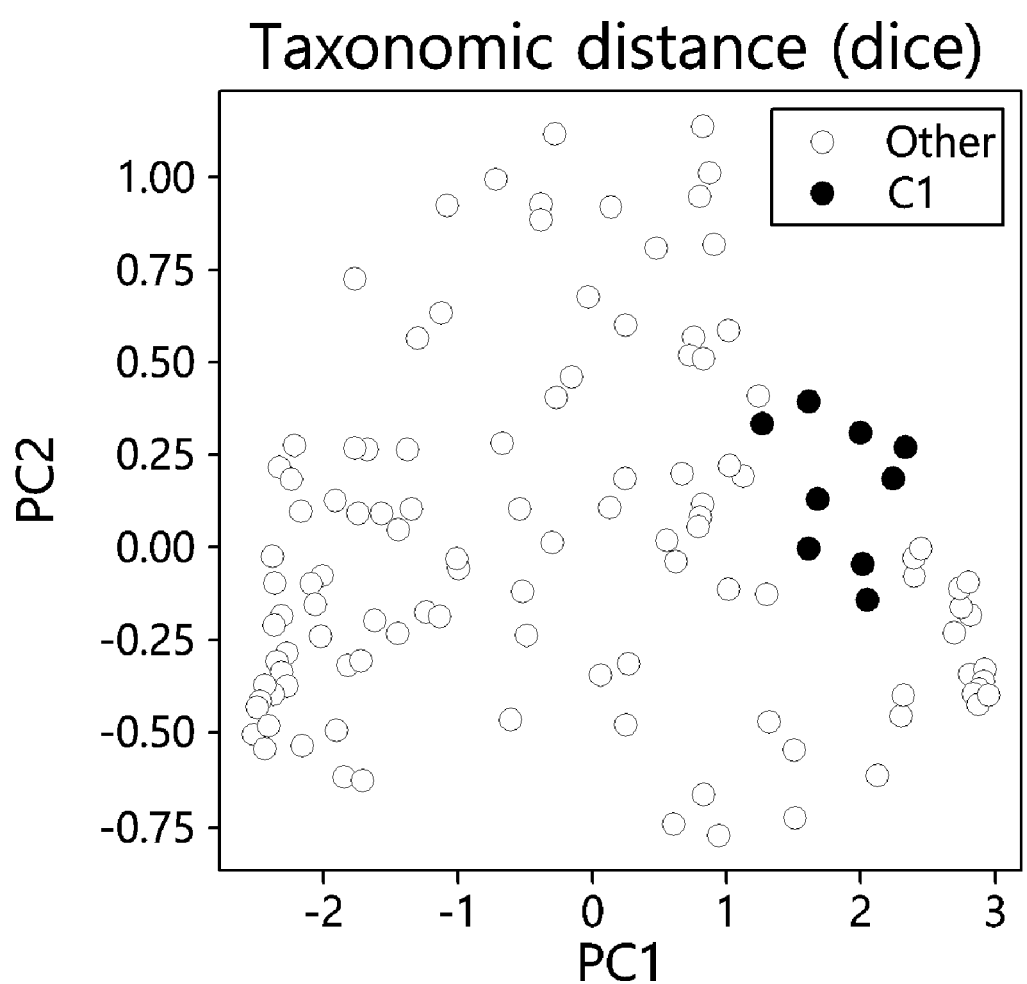

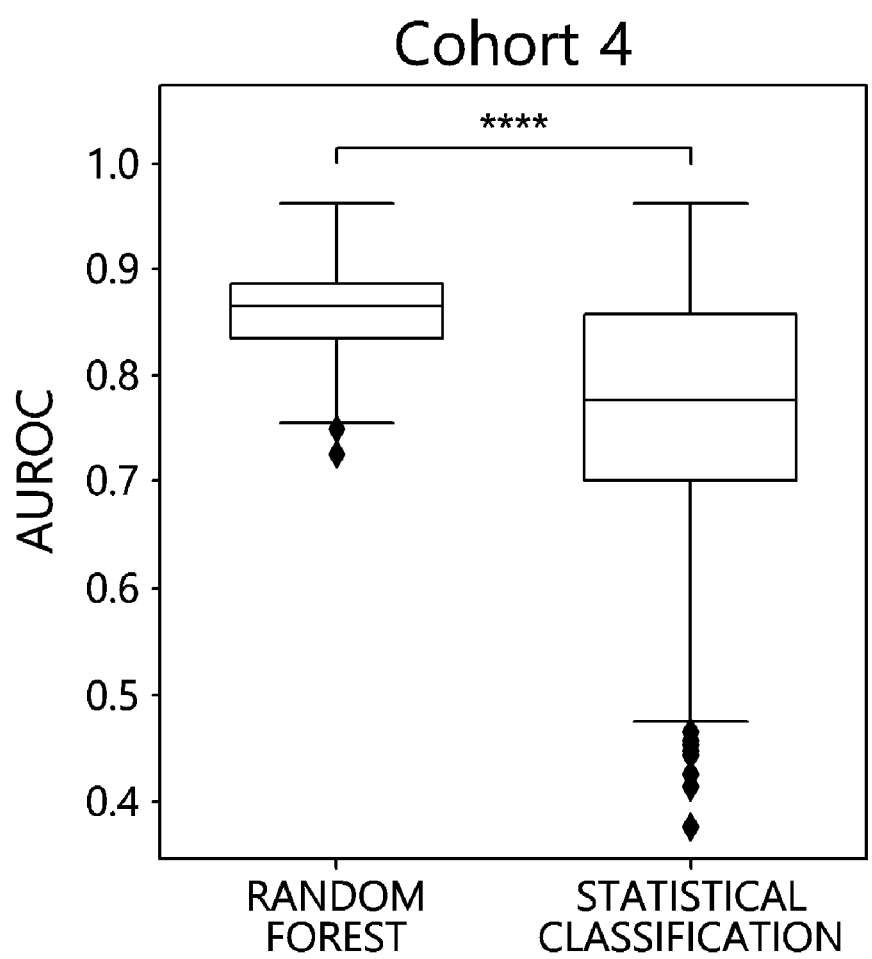

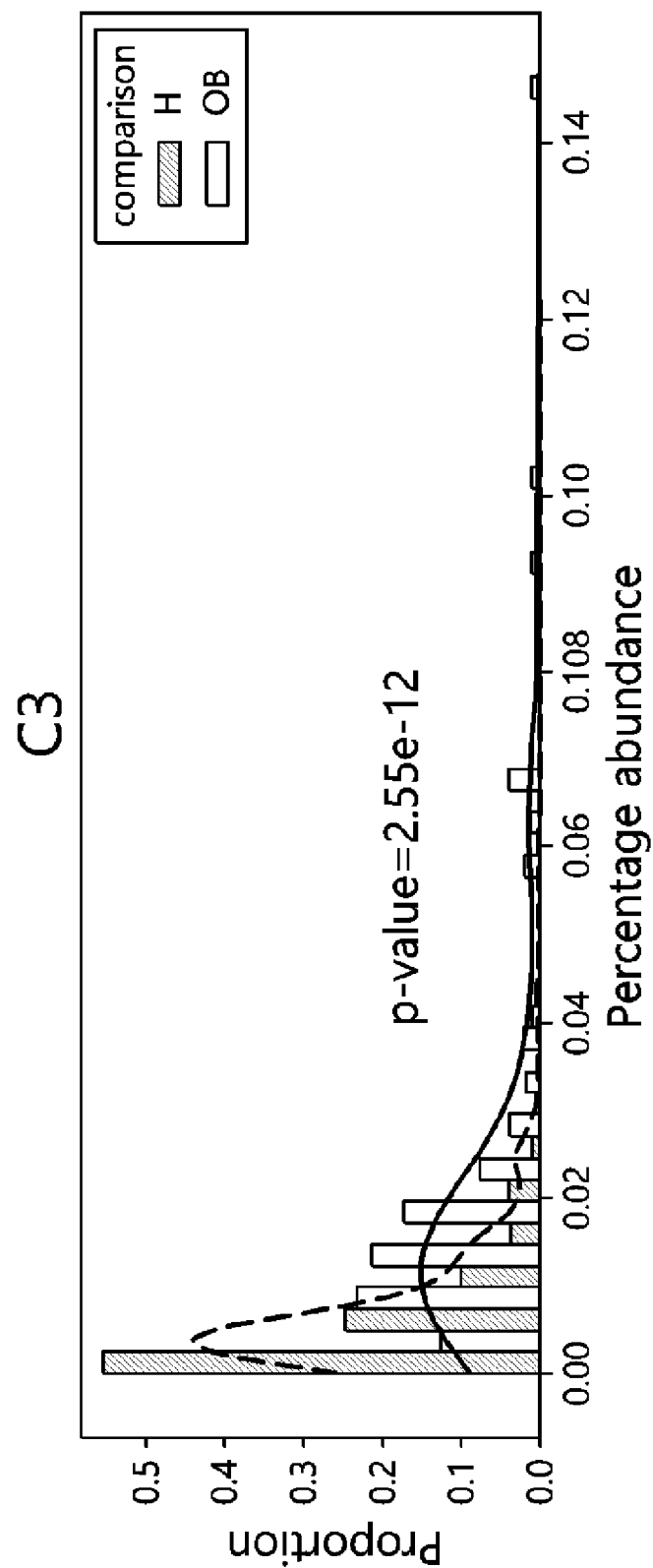

METHOD OF DISCOVERING DISEASE-RELEVANT MICROBIAL CONSORTIA USING MACHINE-LEARNING MODEL

TECHNICAL FIELD

The present disclosure relates to a method of drawing disease-relevant microbial consortia using machine-learning model.

BACKGROUND

Changes in the gut microbiota have a variety of effects on the human body, such as aging and health. Particularly in diseases, imbalances in the normal intestinal microflora are associated with gastrointestinal conditions such as inflammatory bowel disease (IBD) and a wide range of systemic symptoms of diseases such as obesity and atopy. Therefore, probiotics, living microorganisms that benefit the health of the host, have emerged to regulate the structure of the gut microbiota. Currently, probiotics as food or food supplement and live biotherapeutic product (LBP) as a drug for the treatment of diseases are in the spotlight.

The next-generation probiotics (NGP) that treat diseases using gut microorganisms do not transplant the entire flora of a healthy person (Fecal microbiota transplantation; FMT), but selectively treat only microorganisms destroyed by disease, so disease-specific treatment(LBP) is possible. Recently, several candidates have been identified as NGPs, but most of them have specific nutritional requirements and have practical problems with achieving biomass containing high viable cell numbers and even maintaining long-term viability. However, to ameliorate these problems and at the same time block the possibility that a single bacterial strain is not sufficient to achieve the improvement effect, the use of a disease-relevant microbe consortium (a group of two or more symbiotic microorganisms) as an LBP will further enhance performance.

In a similar case of using microbial information to determine diseases, European Patent No. 3097211 presents a method of analyzing microbial information in patients using a sampling kit to obtain microbial information of patients, or Chinese Patent No. 114854847 provides a method of generating a machine learning model that determines a disease based on genetic or microbial information of a host.

SUMMARY

As part of the development of next-generation probiotics, the present application intends to provide a method for deriving microbial community data (hereinafter referred to as disease-microbial consortium) related to specific diseases.

The present disclosure provides, a method of drawing microbial cluster data using a machine learning model by computing device, comprising: (1) a process of collecting gut microbiota data to draw a candidate microbial cluster data from the collected data; and (2) a process of drawing a disease relevant microbial cluster data from the candidate microbial cluster data.

Also, the present disclosure provides, a device of drawing microbial cluster data using a machine learning model by computing device, comprising: a collecting unit configured to collect gut microbiota data; a candidate consortium drawing unit configured to draw a candidate microbial cluster data from the collected data; and a disease-relevant consortium drawing unit configured to draw a disease relevant microbial cluster data from the candidate microbial cluster data.

Effect of the present application comprises drawing not only information of individual microorganism related to a specific disease, but also microbe consortiums related to a specific disease such as microbiome, microbiota, or etc.

BRIEF DESCRIPTION OF THE DRAWINGS

FIG. 5B shows a result of comparing predictive performances by best-performing ML model according to the present disclosure, and by statistical-based method, in the process of discovering disease(obesity)-relevant microbial consortia by 16S rRNA amplicon sequencing data.

FIG. 6A shows a feature importance of the best-performing ML model according to the present disclosure in cohort 1, in the process of discovering disease(obesity)-relevant microbial consortia by 16S rRNA amplicon sequencing data.

FIG. 6B shows an abundance of the disease(obesity)-relevant consortium in C0, in the process of discovering disease(obesity)-relevant microbial consortia by 16S rRNA amplicon sequencing data.

FIG. 7A shows a distance of microbial members in the disease(obesity)-relevant microbial consortium, in the process of discovering disease(obesity)-relevant microbial consortia by 16S rRNA amplicon sequencing data.

FIG. 8C shows an information of the best-performing ML model according to present disclosure, in the process of discovering disease (clostridioides difficile)-relevant microbial consortia by 16S rRNA amplicon sequencing data.

FIG. 9A shows a feature importance of the best-performing ML model according to the present disclosure in cohort 2, in the process of discovering disease (clostridioides difficile)-relevant microbial consortia by 16S rRNA amplicon sequencing data.

FIG. 11C shows an information of the best-performing ML model according to present disclosure, in the process of discovering disease (rheumatoid arthritis)-relevant microbial consortia by 16S rRNA amplicon sequencing data.

FIG. 13A shows a distance of microbial members in the disease (rheumatoid arthritis)-relevant microbial consortium, in the process of discovering disease(rheumatoid arthritis)-relevant microbial consortia by 16S rRNA amplicon sequencing data.

FIG. 13B is a PCA plot of FIG. 13A.

FIG. 14B shows a result of comparing predictive performances by best-performing ML model according to the present disclosure, and by statistical-based method, in the process of discovering disease-relevant microbial consortia by whole metagenome sequencing data.

FIG. 16B shows an abundance of the disease(obesity)-relevant consortium, in the process of discovering disease (obesity)-relevant microbial consortia by whole metagenome sequencing data.

DETAILED DESCRIPTION

Figure 1:
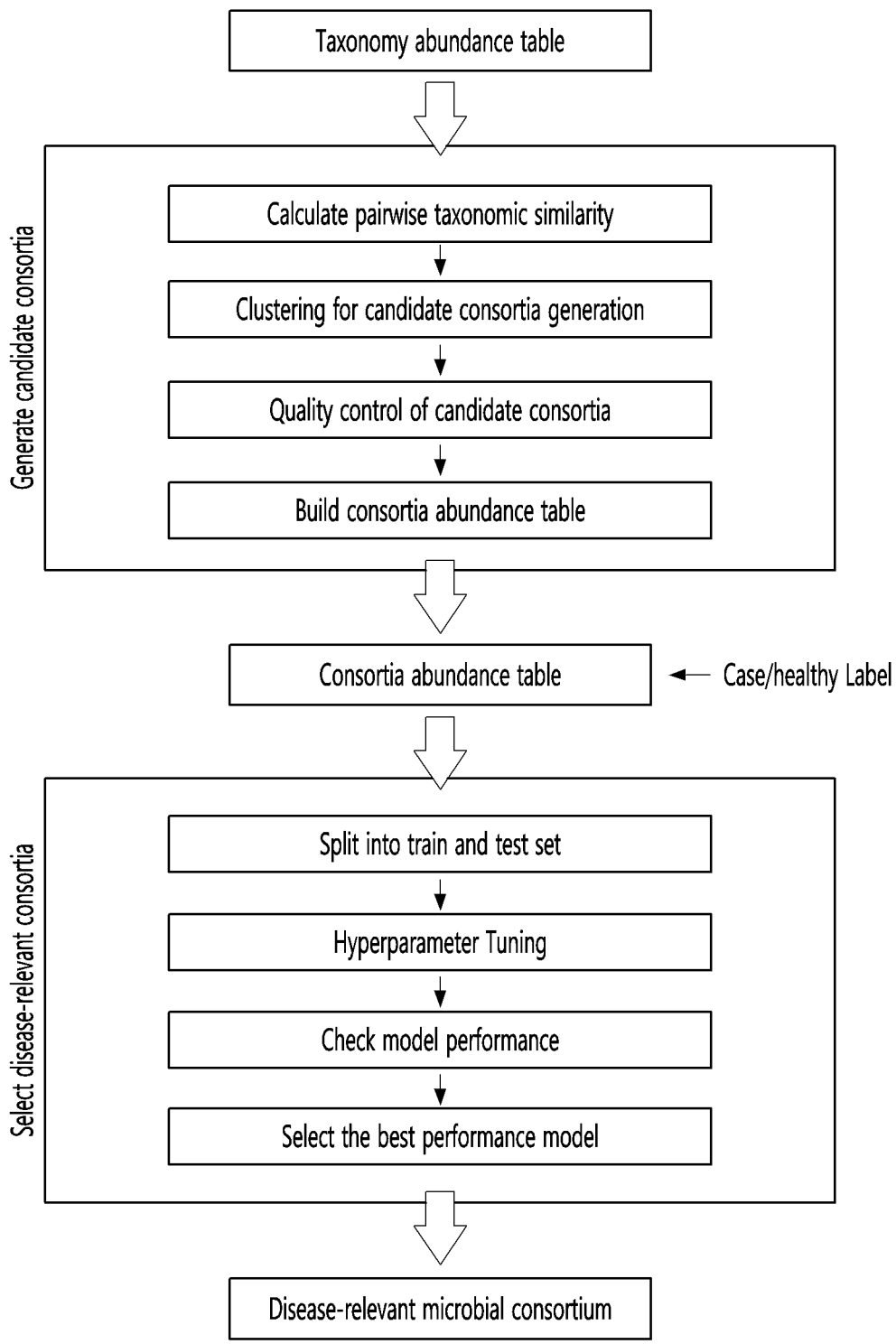
FIG. 1 shows a whole process of the present disclosure.

A Hereafter, embodiments of the present disclosure will be described in detail with reference to the accompanying drawings so that the present disclosure may be readily implemented by a person with ordinary skill in the art. However, it is to be noted that the present disclosure is not limited to the embodiments but may be embodied in various other ways. In drawings, parts irrelevant to the description are omitted for the simplicity of explanation, and like reference numerals denote like parts through the whole document.

Throughout the present document, when a member is positioned "on" another member, this includes not only when the member is in contact with the other member, but also when another member is present between the two members.

Throughout the present document, when a part "comprises" a component, this means that other components may be further included rather than excluding the other components unless there is a particular contrary description.

The terms "approximately" and "substantially" used throughout the document are used in or close to the figure when manufacturing and material tolerances unique to the mentioned meaning are presented and are used to prevent unscrupulous infringers from unfairly using the disclosure. The term "~(doing) step" or "step of~" to the extent used throughout the present specification does not mean "step for~".

Throughout this document, the term "their combination(s)" in the expression of the Markush type refers to one or more mixtures or combinations selected from the group of components described in the Markush type expression.

Throughout the present specification, the description of "A and/or B" means "A or B, or A and B".

Throughout the present specification, the term "Machine Learning" refers to artificial applications where computer programs use algorithms to find patterns in given data. It primarily denotes the field in which computers learn from data and improve through experience. The machine learning algorithms used in this specification are just examples, and all machine learning methods or types that can be used for the invention disclosed herein should be interpreted as included. For instance, machine learning methods may include (1) supervised learning, (2) unsupervised learning, (3) reinforcement learning, (4) semi-supervised learning, and more specifically, Naïve Bayes Classification, Logistic Regression, Decision tree, Random forest, Boosting (XGBoost/ensemble boosting/AdaBoost/Gradient Boost/LightGBM/CatBoost, etc.), Perceptron, Support Vector Machine, Quadratic classifiers, Clustering (K-means clustering, Bayesian network clustering, etc.), among others.

Throughout the present specification, the term "gut microbiota" refers to a complex microbial community living in the digestive tract, digestive microbial, or gastrointestinal microbes, in the gut of humans and other animals.

In the entire specification, "Supervised Learning" in machine learning refers to the process where the model labels specific data groups for learning purposes, while "Unsupervised Learning" means the model clusters similar features within a specific data group without predefined objectives to predict results for new data.

In the present specification, "Clustering" refers to dividing the entire data into groups of similar entities (data) within the given data.

In the present specification, "Quality Control" means the process of creating quality standards to maintain the consistency of product quality, ensuring adherence to these standards in all manufacturing processes.

Throughout the present specification, the term "Consortium" refers to clustered data, and for example, "candidate microbial consortia" means microbial cluster data that could be candidates for the final microbial cluster data desired by the invention. "Disease-relevant microbial consortium" refers to microbial cluster data that can distinguish between patients with a disease and those without, indicating a set of symbiotic relationships of microorganisms found in a specific disease.

The present disclosure aims to draw a microbial cluster that can be used when developing effective probiotics for a specific disease. Specifically, the invention includes (1) drawing a candidate microbial cluster data related to specific disease, which is collected by preprocessing a gut microbiota data (a taxonomy abundance table) and (2) training the machine learning model using the collected candidate microbial cluster data (hereinafter referred as candidate consortium), and selecting a model with the highest predictive performance to draw a disease-microbial consortium (FIG. 1).

The process described in (1) involves drawing candidate microbial consortia using unsupervised learning algorithms, while the process in (2) entails using supervised learning algorithms to draw microbial data (disease-relevant microbial consortium) most relevant to a specific disease from the candidate microbial consortia. Specifically, the mentioned specific diseases could include obesity, Clostridioides Difficile Infection (CDI), Rheumatoid Arthritis (RA), but are not limited to these.

Example 1. Generation of Candidate Microbial Consortia

Figure 2:
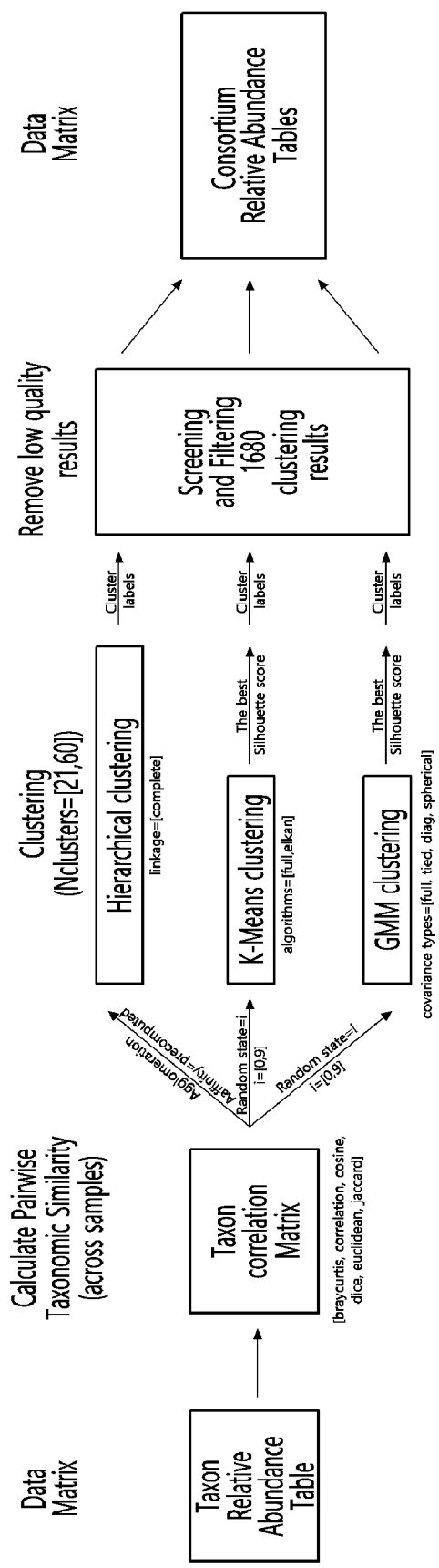
FIG. 2 shows a process of discovering candidate microbial consortia.

To generate candidate microbial consortia, various clustering algorithms are applied, based on similarity of taxonomy abundance (FIG. 2).

1-1. Calculation of Pairwise Similarity Between Taxonomies

For scaling features, the relative taxonomic abundance values are converted to percentage per sample. To define similarity (i.e., 1-distance) between taxonomies, six kinds of similarity measurements were applied to all pairs of taxonomies. For this, the distances were computed using the SciPy (v1.8.0) Python library, then the similarity was obtained by subtracting the calculated distances from 1.

1-2. Clustering for Generation of Candidate Microbial Consortia

To identify candidate microbial consortia, the present inventors employed three types of clustering algorithms with methodological variations, encompassing hierarchical clustering, K-means clustering, and Gaussian mixture model (GMM). These algorithms were applied to a matrix of pairwise taxanomic similarities, which was calculated by using taxanomic abundance across samples. The exploration of hyperparameter Ncluster, which represents the number of clusters, ranged from 21 to 60. Each cluster represents a microbial consortium. The specifics of the similarity measurements, algorithm variations, and Ncluster values used in these procedures can be found in Table 1. Through this process, a total of 1,680 approaches for generating candidate microbial consortia (primary cluster data) were generated for each disease. All implementations were carried out using the Scikit-learn package (v0.24.1).

TABLE 1

Clustering algorithms used for generation of candidate consortia.

| Taxonomic similarity | Algorithm variations | | Ncluster |
|---|---|---|---|
| | Algorithm | Method | |
| 1 - (Bray-Curtis distance), | Hierarchical | complete | [21, 60] |
| 1 - (Correlation distance), | K-Means | elkan, full | |
| 1 - (Cosine distance), | Gaussian Mixture | full, tied, diag, spherical | |
| 1 - (Dice distance), | | | |
| 1 - (Euclidean distance), | | | |
| 1 - (Jaccard distance) | | | |

1-3. Quality Control of Candidate Microbial Consortia

Out of a pool of 1680 results of candidate microbial consortia, one with low quality was filtered out. The quality assessment was based on the number of members within each consortium. Specifically, consortia consisting of either one or two microbes, or those containing more than half of the total microbes were classified as low quality.

1-4. Building Consortium Abundance Tables

The abundance of the consortium was defined as the arithmetic sum of the taxa within a cluster.

Example 2. Selection of Disease-Relevant Consortia

Figure 3:
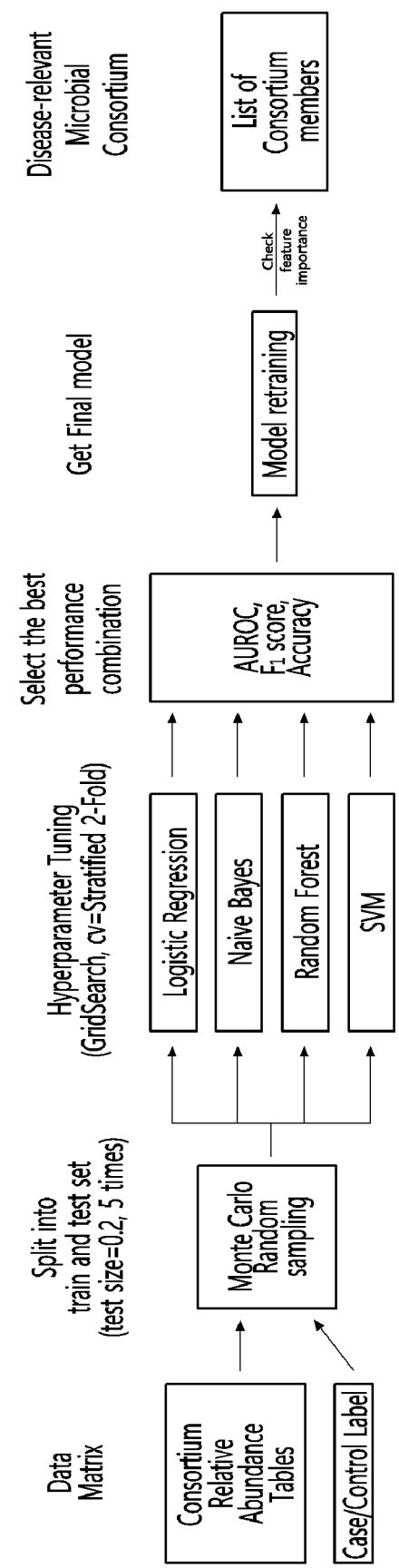
FIG. 3 shows a process of discovering disease-relevant microbial consortium.

The objective of this process is to identify the most pertinent microbial consortium associated with disease using ML-based approach. To accomplish this, the present inventors selected the microbial consortium with the highest feature importance from the ML model that exhibited the best predictive performance. During model training, the ML model adjusted the importance of features, and a higher predictive performance of the ML model indicates that the adjusted feature importance can reliably contributes to predicting future unseen data (FIG. 3).

2-1. Training Strategy

Figure 4:
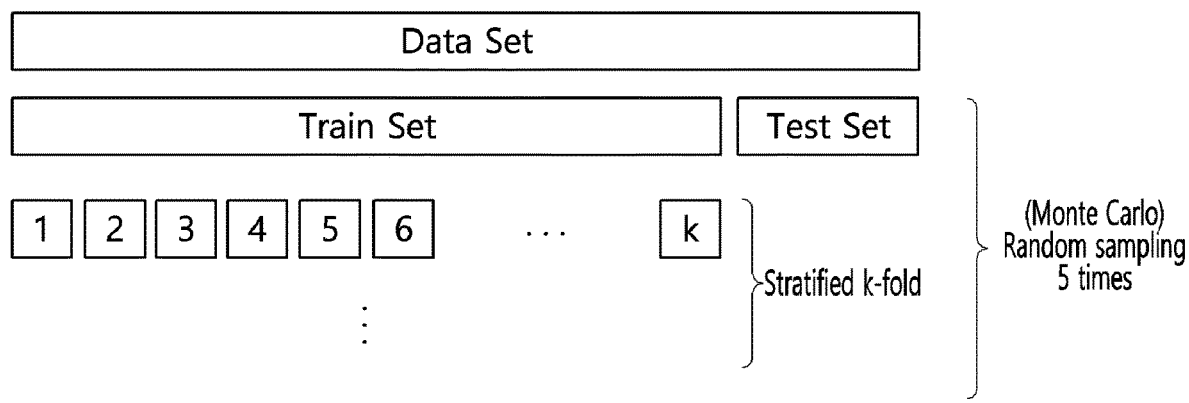
FIG. 4 shows an overview of data split in to training set and test set.

The present inventors trained ML model using all kinds of candidate microbial consortia generated through the process of Example 1. To train the machine learning (ML) model, a dataset was divided into training and test sets using Monte Carlo (MC) sampling. The training set was utilized for ML model training, employing four types of ML algorithms: Logistic regression, Naïve Bayes, Random Forest, and support vector machines (SVM). The hyperparameters of each ML algorithm were determined using the GridSearch strategy. This strategy involved conducting k-fold cross-validation (CV) with various combinations of hyperparameters to identify the best-performing hyperparameters based on CV performance. In both MC sampling and k-fold CV, the ratio of the healthy/disease samples is preserved. The above training process repeated 5 times to train ML model with different training sets (FIG. 4). The hyperparameters of the models are summarized in Table 2.

TABLE 2

ML hyperparameters

| ML algorithm | Setting parameter | Tuning parameter |
|---|---|---|
| Bernoulli Naïve Bayes | binarize = 0.0, fit_prior = True, class_prior = None | alpha: 0.1, 0.2, 0.3, 0.4, 0.5, 0.6, 0.7, 0.8, 0.9, 1.0 |
| Logistic Regression | dual = False, tol = 1e−4, fit_intercept = True, intercept_scaling = 1, class_weight = 'balanced', random_state = 5, solver = 'liblinear', max_iter = 1000, multi_class = 'auto', verbose = 0, warm_start = False, l1_ratio = None | penalty: 11, 12 C: 0.001, 0.005, 0.01, 0.05, 0.1, 0.5, 1 |
| Random Forest | n_estimators = 100, criterion = "gini", min_samples_split = 2, min_samples_leaf = 1, min_weight_fraction_leaf = 0.0, max_features = "sqrt", max_leaf_nodes = None, min_impurity_decrease = 0.0, bootstrap = True, oob_score = False, random_state = 5, verbose = 0, warm_start = False, class_weight = 'balanced', ccp_alpha = 0.0, max_samples = None | max_depth: 2, 3 |
| Support Vector Machine | kernel = 'linear', degree = 3, gamma = scale, coef0 = 0.0, shrinking = True, probability = True, tol = 1e−3, cache_size = 200, class_weight = 'balanced', verbose = False, max_iter = −1, decision_function_shape = 'ovr', break_ties = False, random_state = 5 | C: 0.0001, 0.0005, 0.001, 0.005, 0.01, 0.05, 0.1, 0.5, 1, 5, 10 |

2-2. Model Evaluation Strategy

Evaluating predictive performance of ML model was conducted using test sets. The performance of the model was evaluated using AUROC (Area Under the Receiver Operating Characteristic Curve).

2-3. Selection of Best-Performing ML Model

The best-performing ML model was selected through a two-step process:
(i) identifying the best-performing ML algorithm, and
(ii) selecting the best-performing ML model within that algorithm.

The selection of the best-performing ML algorithm involved comparing the median predictive performances of each algorithm against each other. The algorithm with the highest median predictive performance was chosen as the best-performing ML algorithm. Subsequently, the ML model with the highest predictive performance within the selected algorithm was determined as the best-performing ML model.

For amplicon sequencing data, predictive performance evaluation was conducted using cross-validation. In the case of whole metagenome data, the best-performing model was initially evaluated through cross-validation, and its performance in cross-cohort prediction was assessed by training it using the entire training cohort. This assessment aimed to ensure the model's generalizability across different cohorts. To enable this, only the taxons found in the training cohort were used.

2-4. Discovery and Confirmation of Disease-Relevant Microbial Consortium

The disease-relevant microbial consortium was identified using the absolute value of the feature importance from the best-performing ML model. To validate the relevance of the microbial consortium to the disease, the present inventors compared the abundance of the consortium in healthy individuals with that in individuals with the disease. Furthermore, to determine the interconnectedness of the consortium members, the present inventors compared the distances between microbes within the consortium and those outside of the consortium.

2-5. Classification Using Statistical Test (STAT)-Based Method

As a baseline model, the present inventors created a classifier based on a statistical test. Specifically, in the training set, the present inventors employed a Mann-Whitney U test (MWU) to identify the most discriminatory consortium abundance between the disease and healthy groups. Subsequently, the threshold for classifying disease and healthy samples was determined based on the highest predictive performance observed in the training set. The predictive performance of the statistical-based method was then evaluated using the test set.

Example. 3 Demonstration 3-1. Amplicon Sequencing Data 16S rRNA amplicon sequencing data were obtained from the MicrobiomeHD database (https://doi.org/10.6084/m9.figshare.14531724.v1) for three cohorts encompassing different diseases. Information regarding the data for each cohort is provided in Table 3.

TABLE 3

|  | Cohort 1 | Cohort 2 | Cohort 3 |
|---|---|---|---|
| Disease | Obesity | CDI | RA |
| Author (Year) | Goodrich (2014) | Schubert (2014) | Littman (2013) |
| Assay Type | 16S rRNA | 16S rRNA | 16S rRNA |
| Nationality | British | American | American |
| Healthy | 428 | 153 | 28 |
| Non-healthy | 185 | 84 | 44 |
| Reference number (see [Reference] below) | 11) | 12) | 13) |

3-2. Metagenomic Shotgun Sequencing Data

For metagenomic shotgun sequencing data, disease status of samples was assigned based on Gupta et al.[1], and raw fastq files were obtained from the bioproject mentioned in each paper by Liu R et al., Le Chatelier E et al., Jie Z et al.[2,3,4]. Species abundance tables were generated using biobakery workflows[5]. Information regarding the data for each cohort is provided in Table 4.

TABLE 4

|  | Cohort 4 | Cohort 5 | Cohort 6 |
|---|---|---|---|
| Disease | Obesity | Obesity | Obesity |
| Author (Year) | Liu (2017) | Le Chatelier (2013) | Jie (2017) |
| BioProject | PRJEB12123 | PRJEB4336 | PRJEB21528 |
| Assay Type | Metagenomic shotgun | Metagenomic shotgun | Metagenomic shotgun |

TABLE 4-continued

| | Cohort 4 | Cohort 5 | Cohort 6 |
|---|---|---|---|
| Nationality | Chinese | North European (Danish, French) | Chinese |
| Healthy | 101 | 39 | 75 |
| Non-healthy | 104 | 69 | 8 |
| Reference number (see [Reference] below) | 14) | 15) | 16) |

3-3. Training Parameters or Pipeline Validation

To train the ML model, the present inventors performed MC sampling with an 8:2 ratio to split the dataset into training and test sets. This process was repeated 5 times. Additionally, the present inventors employed a stratified 2-fold division for GridSearch cross-validation (CV). For the STAT method, MC sampling with an 8:2 ratio was applied 50 times to split the dataset into training and test sets. The performance evaluation was based on AUROC. In terms of selecting best-performing ML algorithm and model cohort4 was used. For cross-cohort prediction, cohort4 was used as the training cohort due to its optimal balance between healthy and disease samples, and cohort5 and cohort6 were utilized as test cohorts.

Figure 5A:
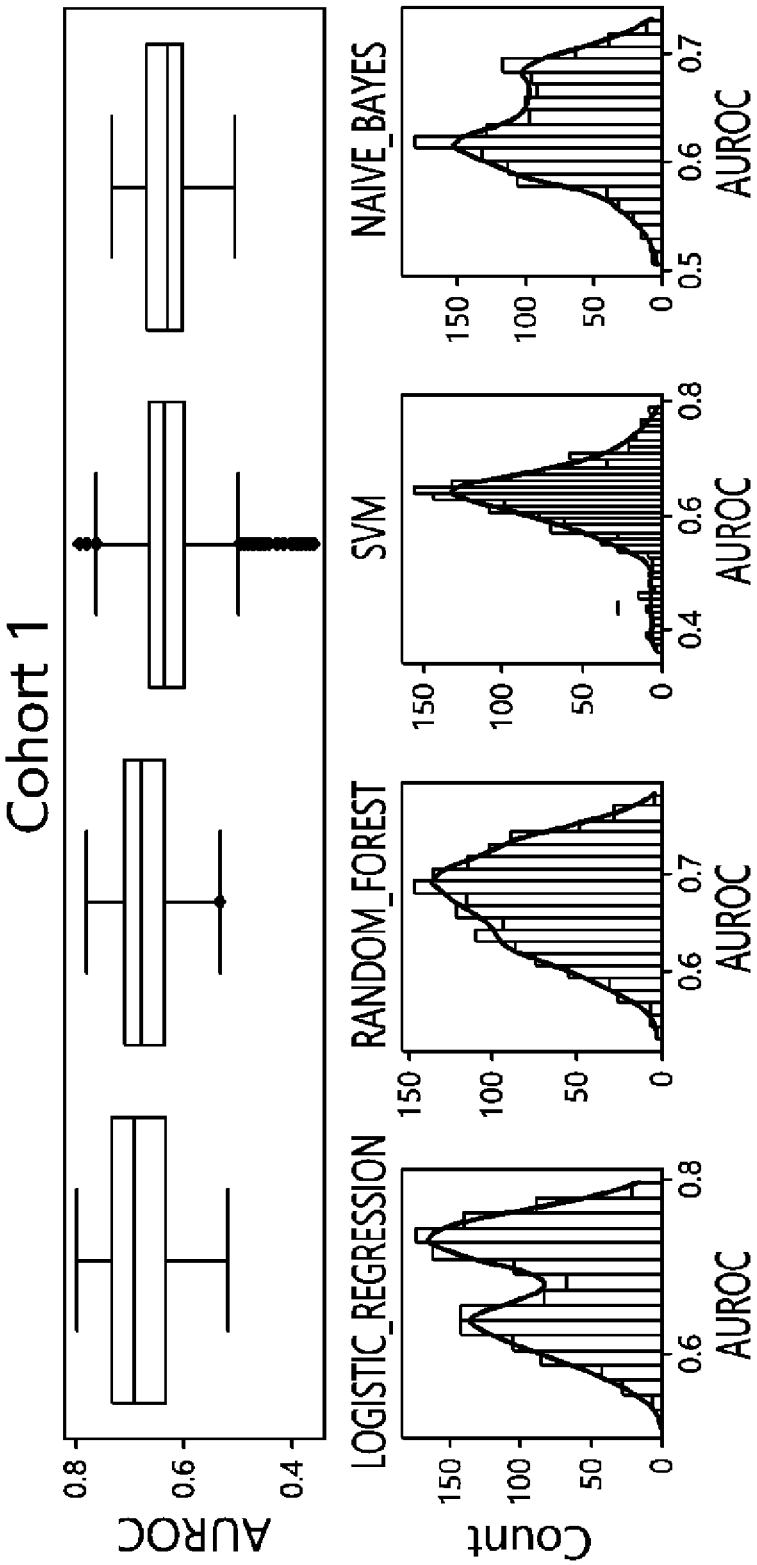
FIG. 5A shows a result of comparing performance of 5 classifiers(algorithms) in the process of discovering microbial consortia relevant to obesity, in the process of discovering disease(obesity)-relevant microbial consortia by 16S rRNA amplicon sequencing data.

Example 4. Discovery of Disease-Relevant Microbial Consortia by 16S rRNA Amplicon Sequencing Data 4-1. Discovery of Microbial Consortia Relevant to Obesity Logistic regression was found as the best-performing ML algorithm. The algorithm exhibited the highest predictive performance (median AUROC:0.698) compared with the other three ML algorithms (FIG. 5A). It can predict the disease status of patients better than statistical-based method, significantly (FIG. 5B) To train and evaluate ML model, Cohort 1 was utilized.

Figure 5C:
FIG. 5C shows an information of the best-performing ML model according to present disclosure, in the process of discovering disease(obesity)-relevant microbial consortia by 16S rRNA amplicon sequencing data.

The best-performing ML model in the logistic regression algorithm exhibited 0.796 AUROC (FIG. 5C). For this ML model, taxanomic similarity was measured using 'correlation' and candidate microbial consortia were identified using the 'kmeans' clustering algorithm with parameters set as 'algorithms=full' and 'Nclusters=42' (FIG. 5C).

The best-performing ML model discovered C0 as the disease-relevant microbial consortium. It exhibited the highest absolute value of feature importance (FIG. 6A). Furthermore, the C0 abundance showed significant difference between obesity group (median abundance: 0.196) and healthy group (median abundance: 0.114) ($P=4.27 \times 10^{-8}$) (FIG. 6B).

Figure 7B:
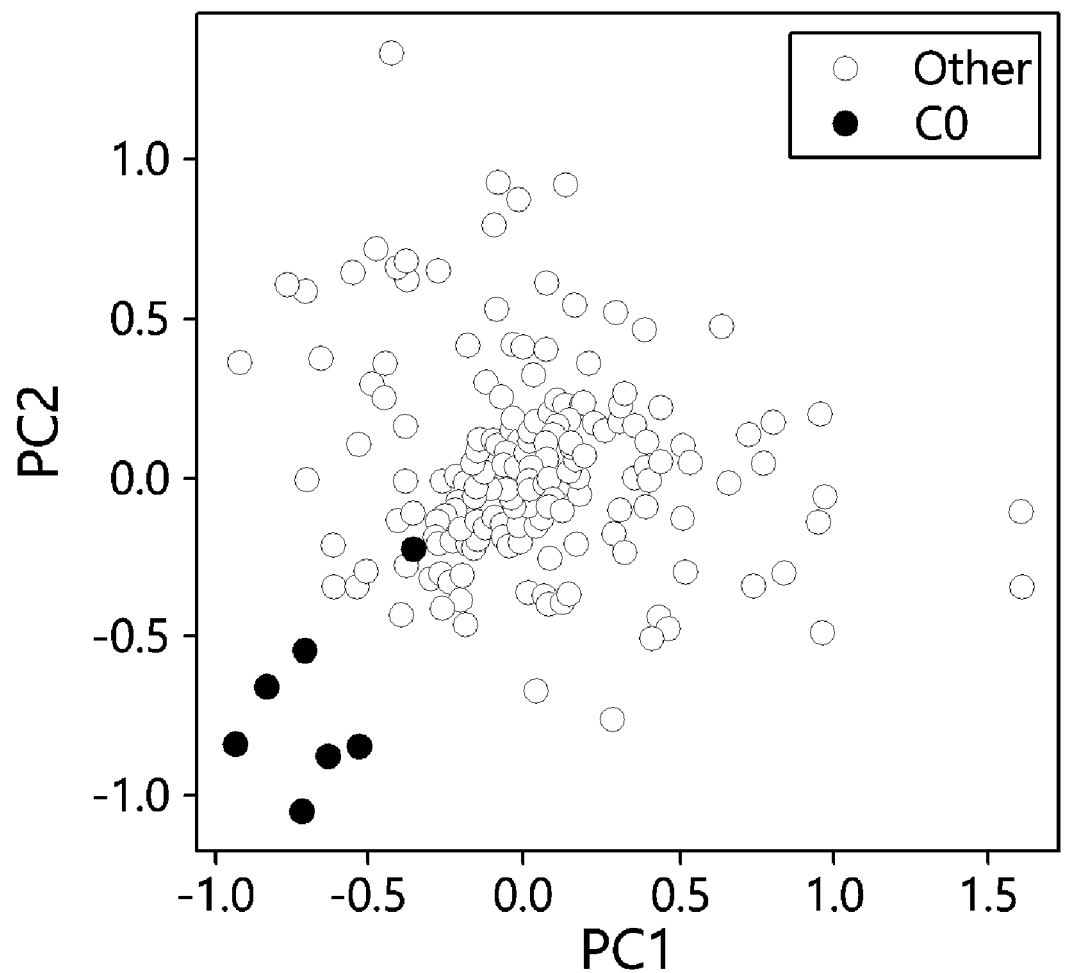
FIG. 7B is a PCA plot of FIG. 7A.

It is confirmed that microbial members of C0 were indeed related to each other. It was verified that the taxanomic distance between internal members of C0 was found to be closer than the distance between the members of consortium C0 and other consortium members (FIG. 7A). The distance was visualized using PCA plots in FIG. 7B.

The validity of the identified obesity-relevant consortium (C0) was further supported by previous research. C0 includes Ruminococcaceae families (Table 5). This finding aligns with a previous study conducted by Peters et al. (2018)[6], which reported a depletion of certain Ruminococcaceae genera, such as *Oscillibacter*, in obese individuals. Additionally, C0 includes other genera such as Incertae Sedis XIII, Desulfovibrionaceae, and unclassified species. These findings suggest that our pipeline has the potential to identify both previously reported and novel members of the obesity-relevant consortium, indicating its comprehensive capability.

TABLE 5

Member of the disease relevant microbial consortium of consortium C0

| Phylum | Class | Order | Family | Genus |
|---|---|---|---|---|
| Firmicutes | Unclassified | Unclassified | Unclassified | Unclassified |
| | Clostridia | Clostridiales | Unclassified | Unclassified |
| | | | Incertae Sedis XIII | Unclassified |
| | | | Ruminococcaceae | Unclassified |
| | | | | *Oscillibacter |
| | | | | Sporobacter |
| Proteobacteria | Deltaproteobacteria | Desulfovibrionales | Desulfovibrionaceae | Desulfovibrio |

Figure 8A:
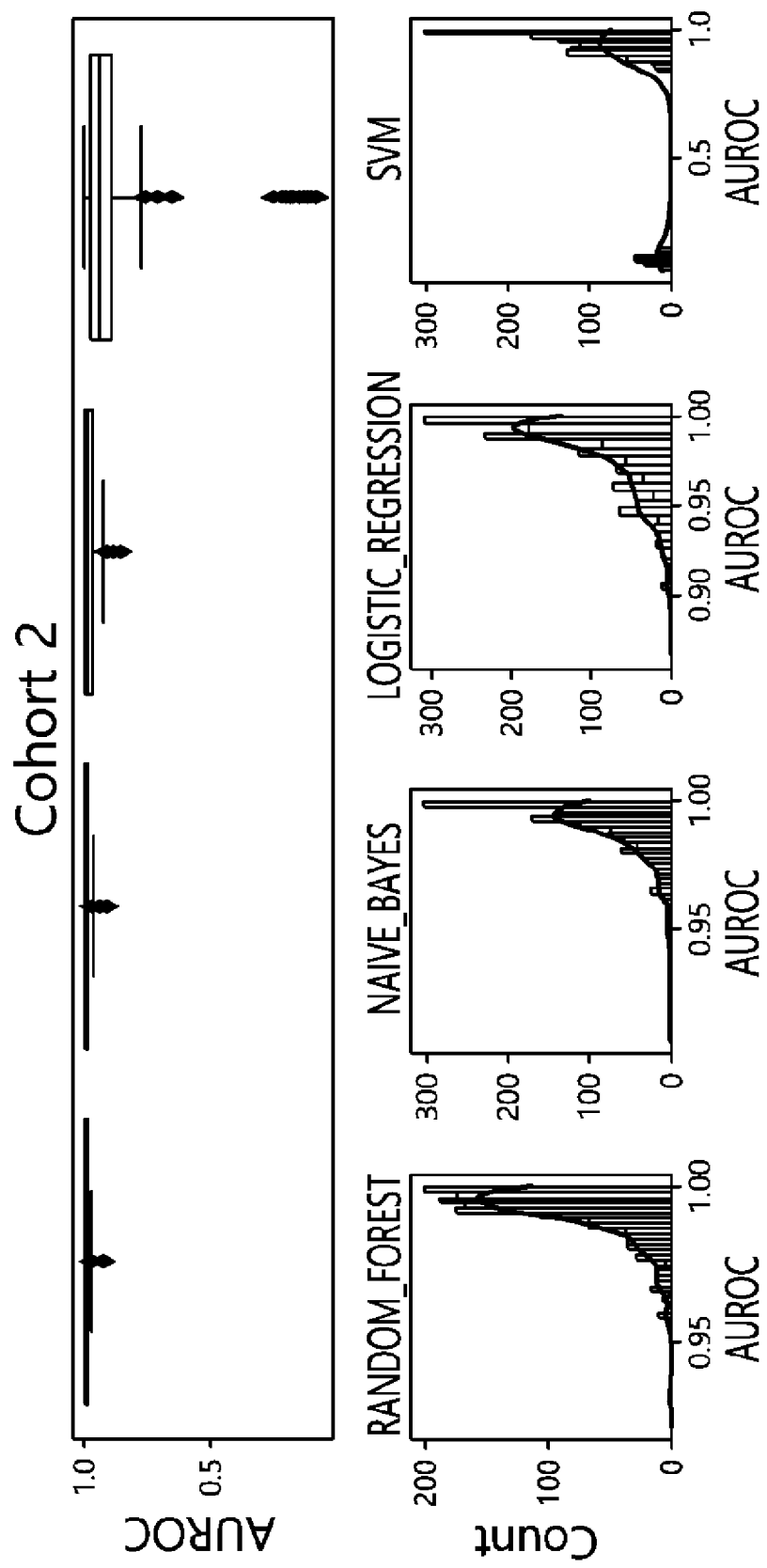
FIG. 8A shows a result of comparing performance of 5 classifiers(algorithms) in the process of discovering microbial consortia relevant to CDI, in the process of discovering disease (clostridioides difficile)-relevant microbial consortia by 16S rRNA amplicon sequencing data.
Figure 8B:
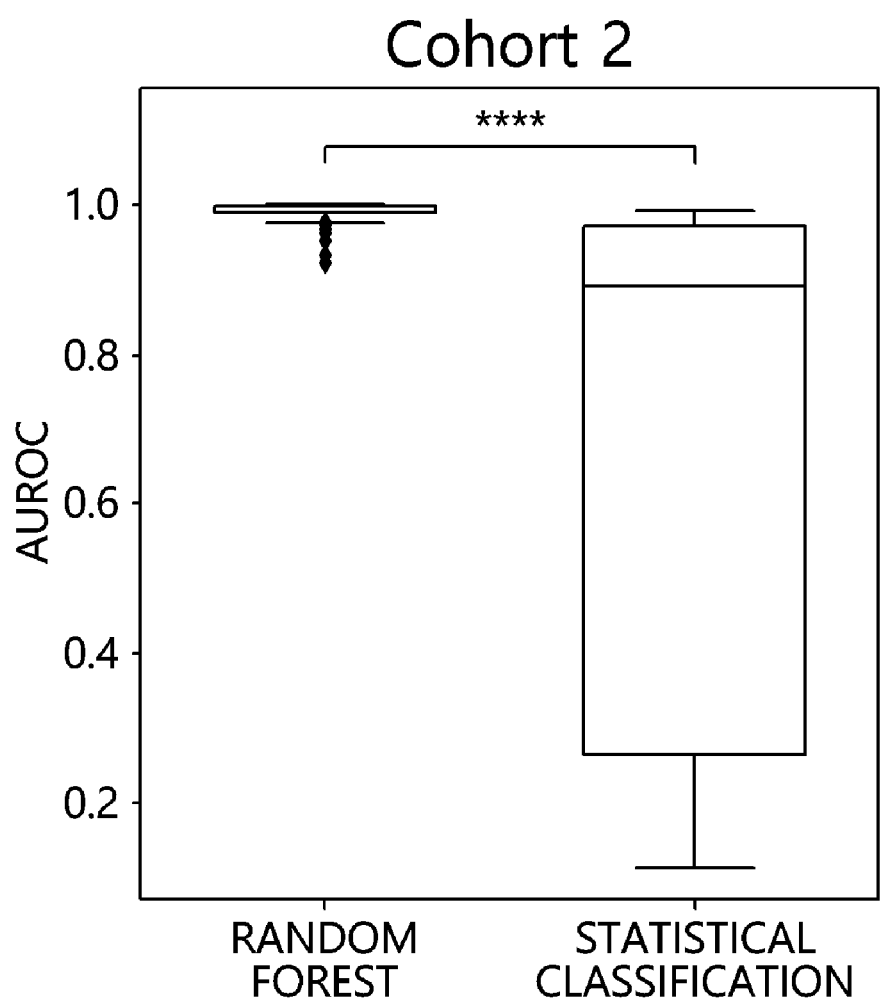
FIG. 8B shows a result of comparing predictive performances by best-performing ML model according to the present disclosure, and by statistical-based method, in the process of discovering disease (clostridioides difficile)-relevant microbial consortia by 16S rRNA amplicon sequencing data.

*mentioned in the literature 4-2. Discovery of Microbial Consortia Relevant to CDI Random Forest was found as the best-performing ML algorithm. The algorithm demonstrated the highest performance (median AUROC: 0.994) compared with the other four ML algorithms (FIG. 8A). Furthermore, the predictive performance of the ML algorithm outperformed that of the method based on statistical approach (FIG. 8B).

The best-performing ML model in the random forest showed an AUROC of 1.0 (FIG. 8C). The model parameters used were as follows: taxonomic similarity was measured using the "correlation" method, and the clustering algorithm "GMM" was employed to identify candidate microbial consortia. The specific parameters set for the GMM algorithm were 'covariance=full' and 'Nclusters=22'. (FIG. 8C).

Figure 9B:
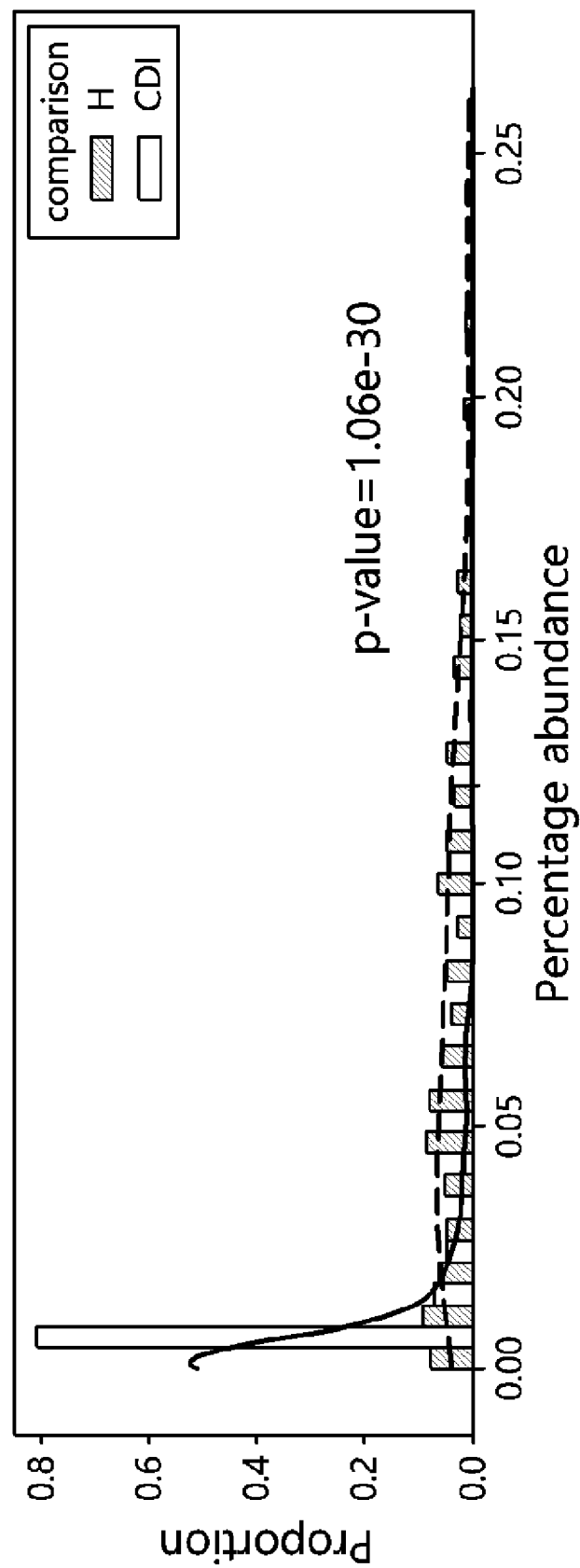
FIG. 9B shows an abundance of the disease (clostridioides difficile)-relevant consortium in C17, in the process of discovering disease(clostridioides difficile)-relevant microbial consortia by 16S rRNA amplicon sequencing data.

The consortium labeled as C17 was identified as the most CDI-relevant microbial consortium. It exhibited the highest feature importance (FIG. 9A), and C17 demonstrated a significantly higher consortium abundance distribution in the healthy group (median=0.062) compared to the CDI group (median=0.001) ($P=1.06 \times 10^{-30}$) (FIG. 9B).

Figure 10A:
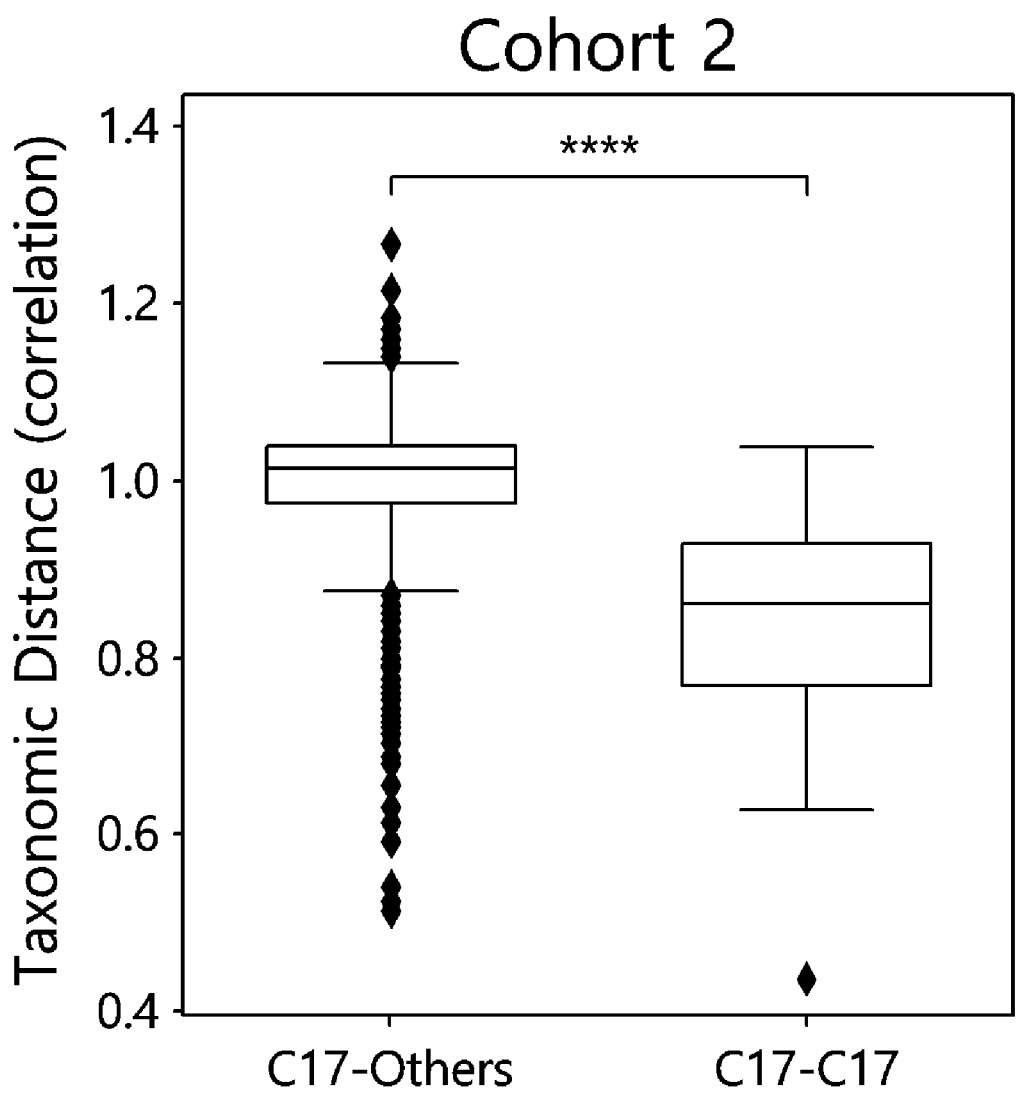
FIG. 10A shows a distance of microbial members in the disease (clostridioides difficile)-relevant microbial consortium, in the process of discovering disease(clostridioides difficile)-relevant microbial consortia by 16S rRNA amplicon sequencing data.
Figure 10B:
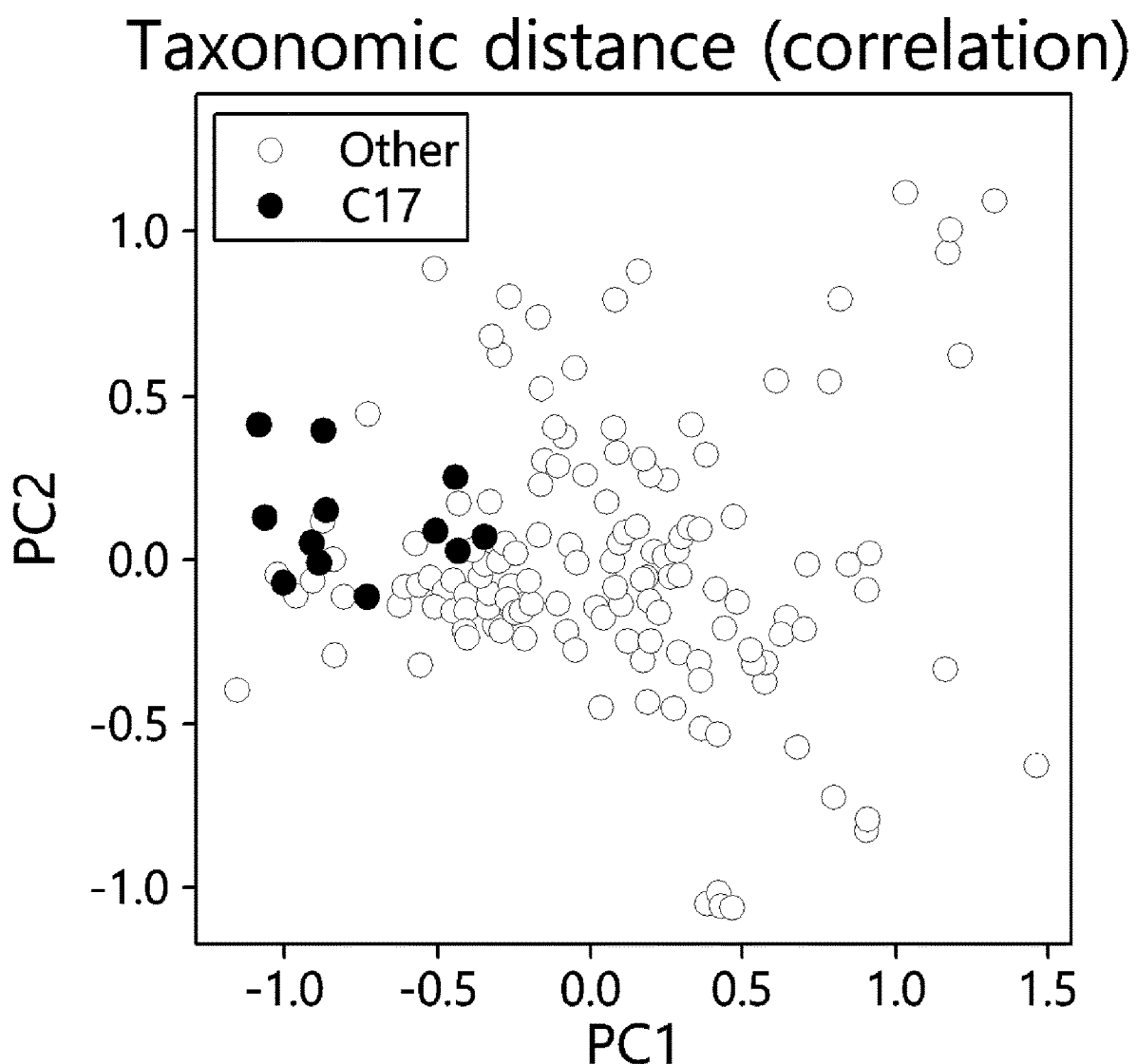
FIG. 10B is a PCA plot of FIG. 10A.

It is confirmed that microbial members of C17 were closely related with each other (FIG. 10A). The distance between internal members of C17 was found to be closer than the distance between the members of consortium C17 and other consortium members. The distance was visualized using PCA plots (FIG. 10B).

The validity of the identified CDI-relevant microbial consortium (C17) was further supported by previous research. The members of C17 included Lachnospiraceae and *Ruminococcus*(Table 6). This observation aligns with a previous study by Martinez et al. (2022)[7], which reported the depletion of some Lachnospiraceae and *Ruminococcus* in CDI individuals. In addition, C17 included the other genera, such as *Acholeplasma* and *Anaerovorax*. These findings suggest that our pipeline has the potential to identify both previously reported and novel members of the CDI-relevant consortium, indicating its comprehensive capability.

4-3. Discovery of Microbial Consortia Relevant to RA

Figure 11A:
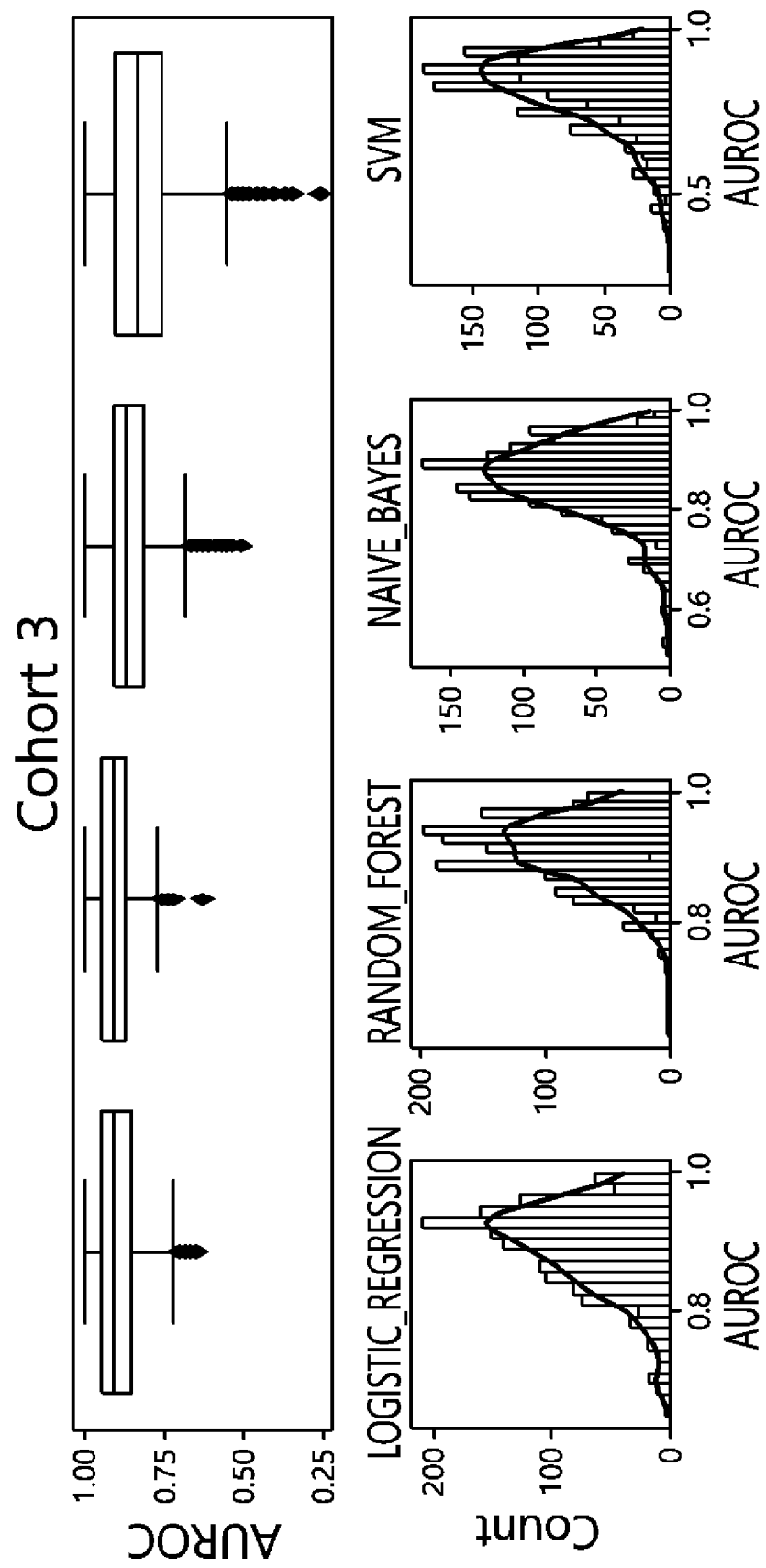
FIG. 11A shows a result of comparing performance of 5 classifiers(algorithms) in the process of discovering microbial consortia relevant to RA, in the process of discovering disease (rheumatoid arthritis)-relevant microbial consortia by 16S rRNA amplicon sequencing data.
Figure 11B:
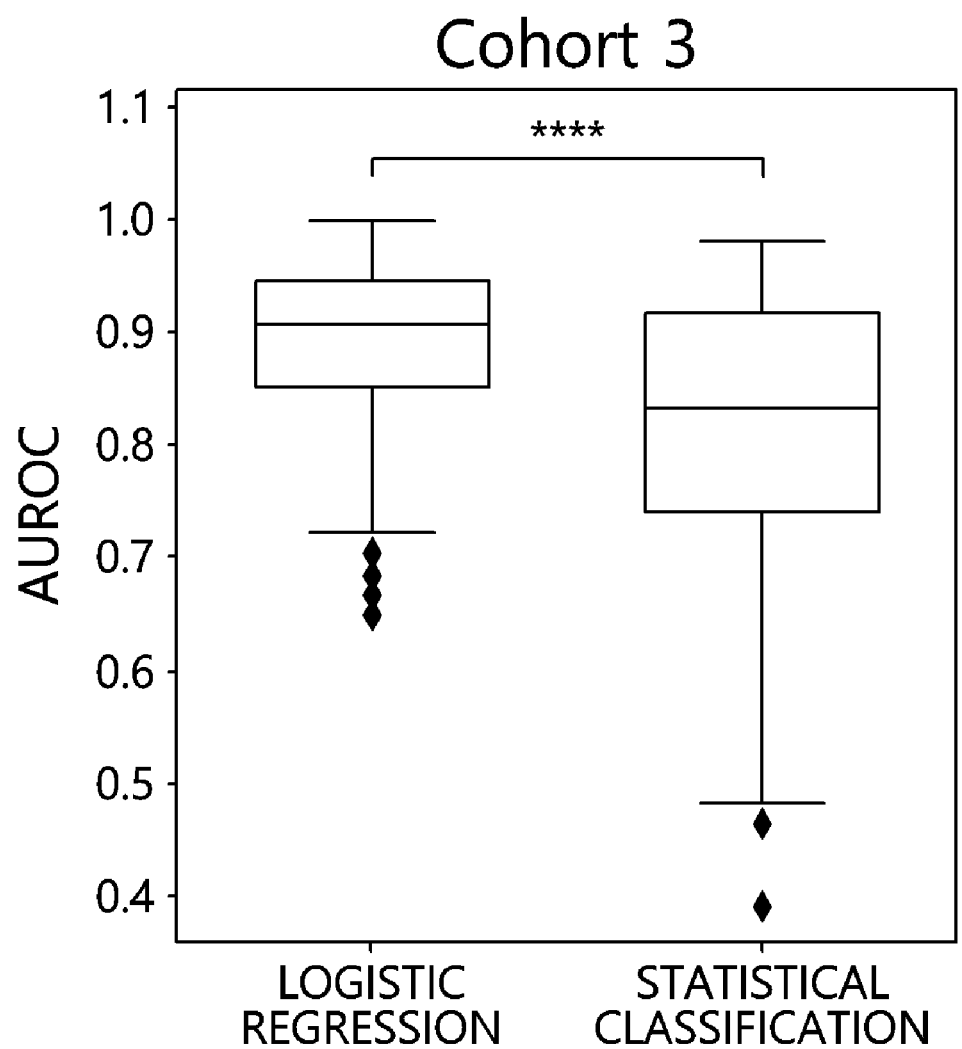
FIG. 11B shows a result of comparing predictive performances by best-performing ML model according to the present disclosure, and by statistical-based method, in the process of discovering disease (rheumatoid arthritis)-relevant microbial consortia by 16S rRNA amplicon sequencing data.

Logistic regression was demonstrated as the best-performing ML algorithm. The algorithm exhibited the highest performance (median AUROC: 0.907) compared with the other four methods (FIG. 11A). Furthermore, the performance of the ML algorithm outperformed that of the statistical-based approach (FIG. 11B).

The best-performing ML model in the logistic regression exhibited an AUROC of 1.0 (FIG. 11C). For this ML model, taxanomic similarity was measured using 'dice' and candidate microbial consortia were identified using 'kmeans' clustering algorithm with parameters 'algorithms=full' and 'Nclusters=22'.

Figure 12A:
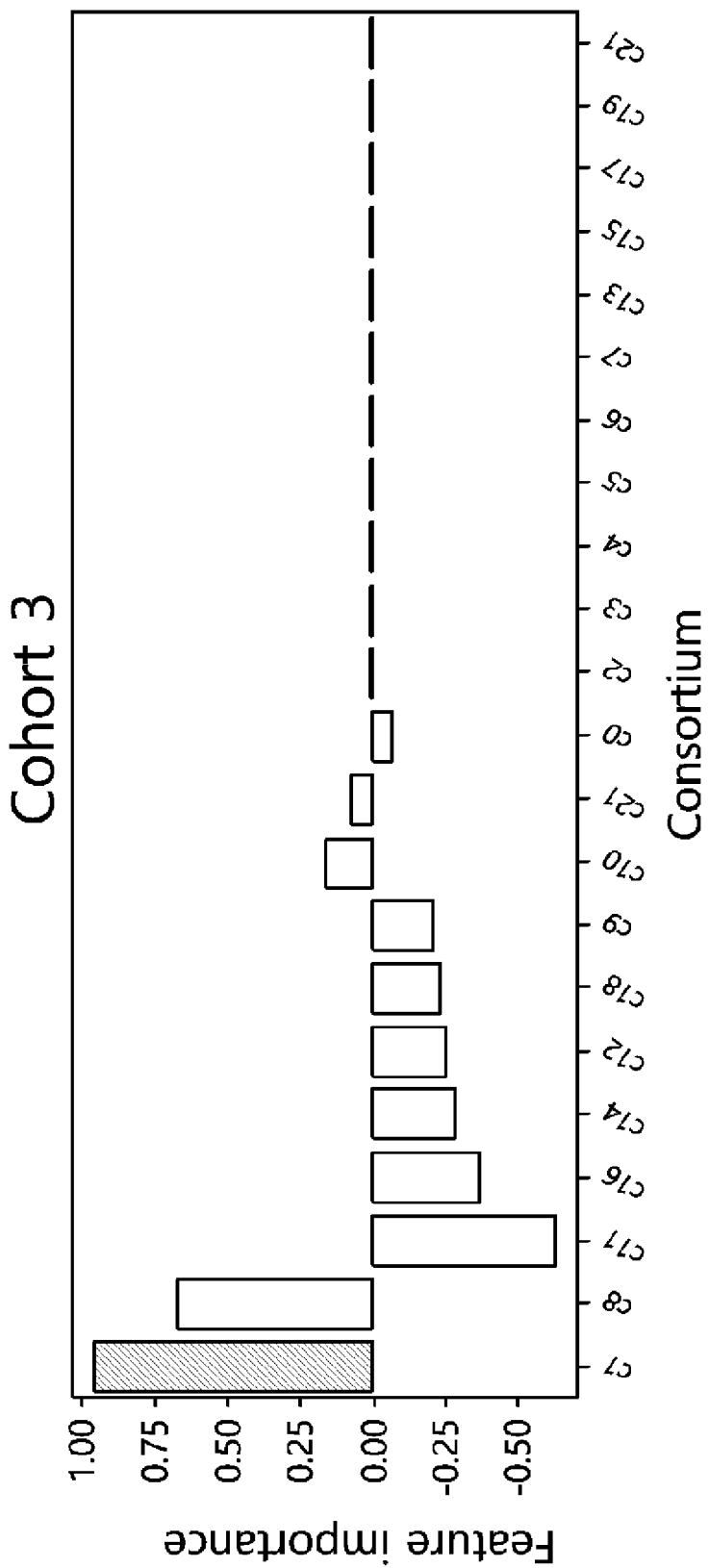
FIG. 12A shows a feature importance of the best-performing ML model according to the present disclosure in cohort 3, in the process of discovering disease (rheumatoid arthritis)-relevant microbial consortia by 16S rRNA amplicon sequencing data.
Figure 12B:
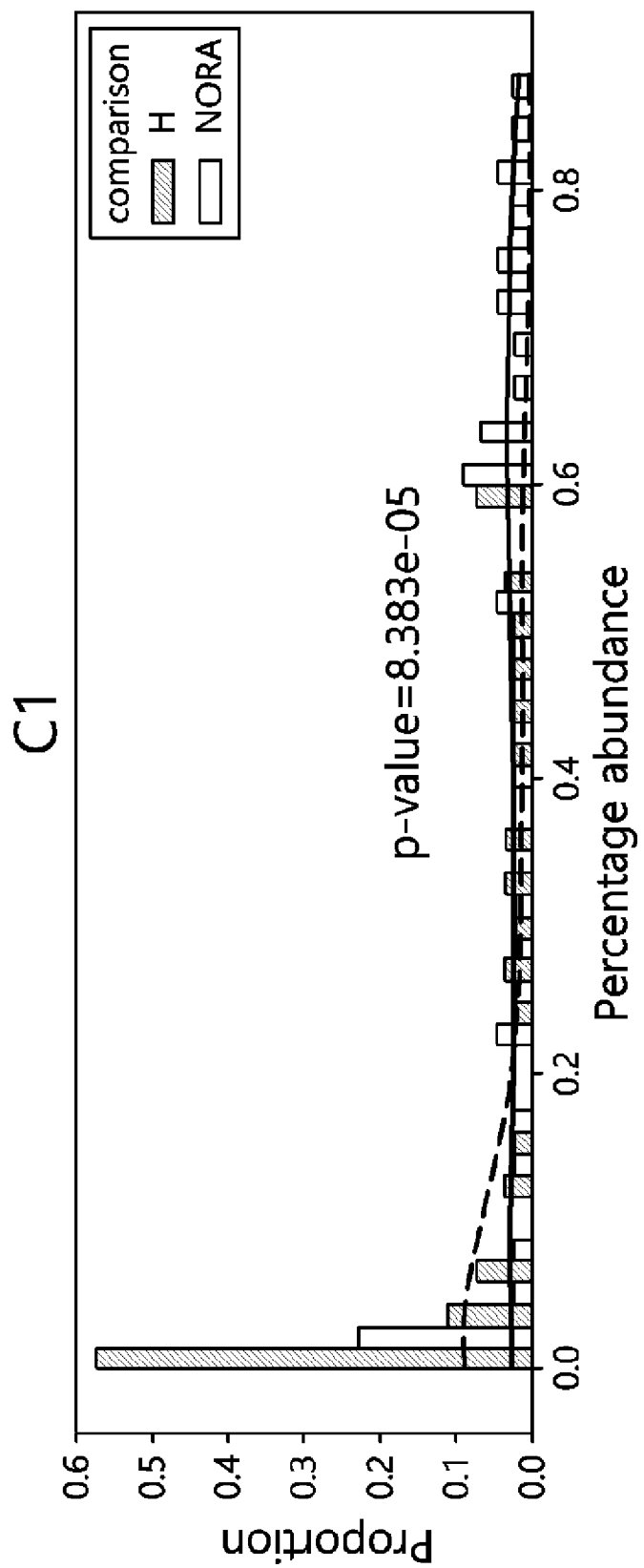
FIG. 12B shows an abundance of the disease (rheumatoid arthritis)-relevant consortium in C1, in the process of discovering disease(rheumatoid arthritis)-relevant microbial consortia by 16S rRNA amplicon sequencing data.

The consortium labeled as C1 was discovered as the most RA-relevant microbial consortium [FIG. 13]. It exhibited the highest feature importance [FIG. 13A]. Consortium abundance of C1 exhibited a significantly higher abundance distribution in the RA group(median=0.444) compared to the healthy group (median=0.012) ($P=8.38 \times 10^{-0.5}$) (FIG. 12B).

It is confirmed that microbial members of C1 were closely related with each other (FIG. 13). The distance between internal members of C1 was found to be closer than the distance between the members of consortium C1 and other consortium members (FIG. 13A). The distance was visualized using PCA plots (FIG. 11B).

The validity of the identified RA-relevant microbe consortium C1 was further supported by previous study. The internal members of C1 included *Prevotella* [Table 7]. Several studies[8,9,10] have reported an increase in *Prevotella* in RA (rheumatoid arthritis) groups compared to healthy groups. In addition, C1 included other genera, such as *Anaerotruncus, Pseudoflavonifractor, Dialister*, and so on. These findings suggest that pipeline of the present disclosure has the potential to discover both previously reported and novel members of the RA-relevant consortia, indicating its comprehensive capability.

TABLE 6

Member of the disease relevant microbial consortium of consortium C17

| Phylum | Class | Order | Family | Genus |
| --- | --- | --- | --- | --- |
| Unclassified | Unclassified | Unclassified | Unclassified | Unclassified_Bacteria |
| Firmicutes | Unclassified | Unclassified | Unclassified | Unclassified |
| | Clostridia | Unclassified | Unclassified | Unclassified |
| | | Clostridiales | Unclassified | Unclassified |
| | | | Incertae Sedis XIII | *Anaerovorax* |
| | | | *Lachnospiraceae | *Syntrophococcus incertae_sedis* |
| | | | *Ruminococcaceae | *Clostridium_III* |
| | | | | *Clostridium_IV* |
| | | | | *Ruminococcus* |
| Tenericutes | Mollicutes | Acholeplasmatales | Acholeplasmataceae | *Acholeplasma* |

*mentioned in the literature

TABLE 7

Member of the disease relevant microbial consortium of consortium C1

| Phylum | Class | Order | Family | Genus |
|---|---|---|---|---|
| Bacteroidetes | Bacteroidia | bacteroidales | *Prevotellaceae | *Prevotella |
| Firmicutes | Bacilli | Lactobacillus | Streptococcaceae | Streptococcus |
|  | Clostridia | Clostridiales | Clostridiaceae 1 | Clostridium sensu stricto |
|  |  |  | Ruminococcaceae | Anaerotruncus Clostridium_IV Pseudoflavonifractor |
|  | Negativicutes | Selenomonadales | Veillonellaceae | Dialister Veillonella |

*mentioned in the literature

Example 5. Discovery of Disease-Relevant Microbial Consortia by Whole Metagenome Sequencing Data The present inventors further validated that pipeline of the present disclosure is capable of discovering disease-relevant microbial consortium using whole metagenome sequencing data. Whole metagenome sequencing data offers the advantage of identifying microbes at the species level, whereas 16S rRNA amplicon sequencing provides information at the genus level. Through this, the present inventors tried to confirm whether the present disclosure could discover a disease-relevant microbial consortia well regardless of the type of sequencing data.

5-1. Selecting a Best-Performing ML Model

Figure 14A:
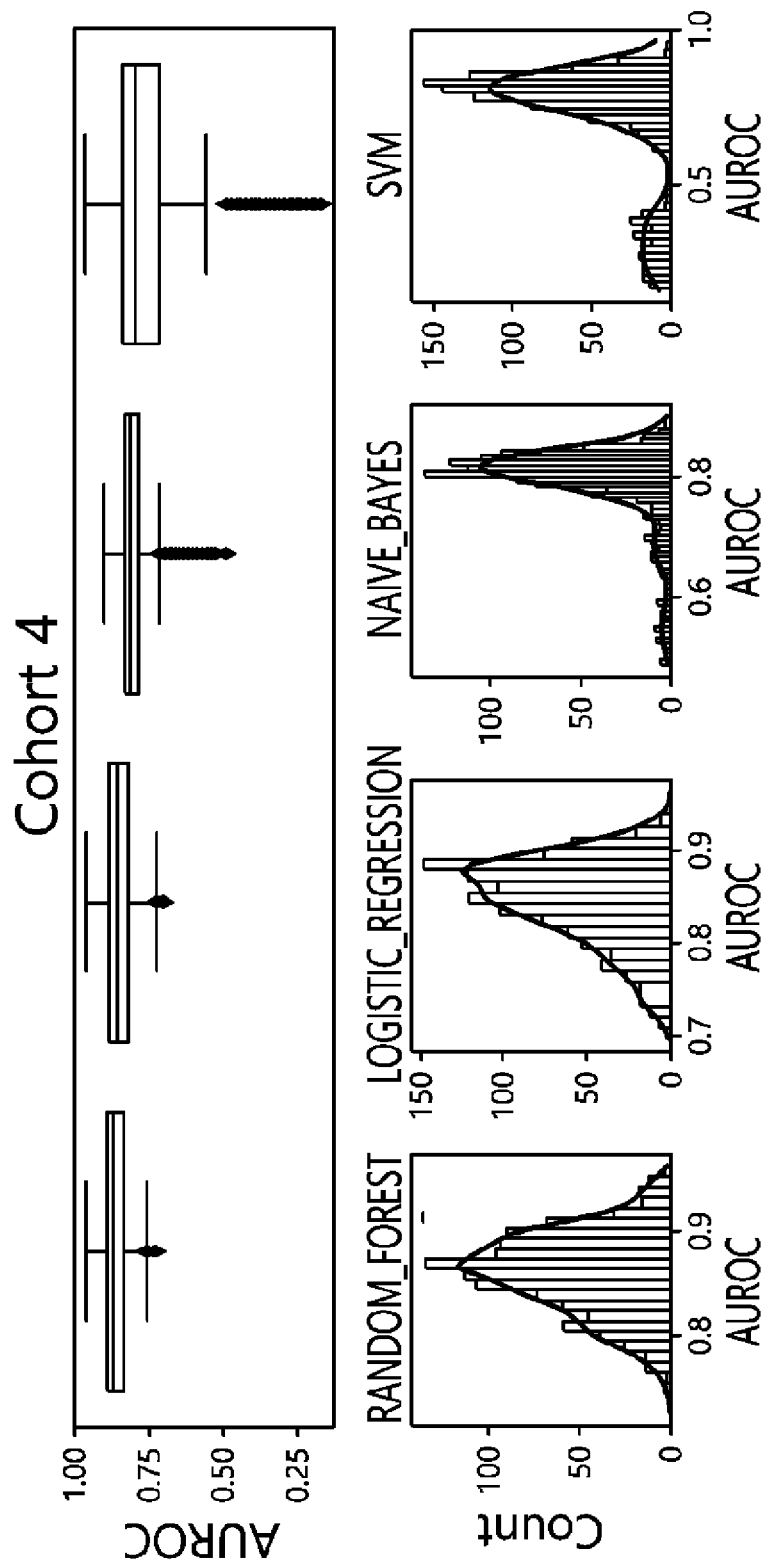
FIG. 14A shows a result of comparing predictive performances by best-performing ML model according to the present disclosure, and by statistical-based method, in the process of discovering disease-relevant microbial consortia by whole metagenome sequencing data.

Random forest was found as the best-performing ML algorithm. The algorithm exhibited the highest predictive performance (median AUROC: 0.854)(FIG. 14A). It can predict the disease status of patients better than statistical-based method, significantly (FIG. 14B).

Figure 14C:
FIG. 14C shows an information of the best-performing ML model according to present disclosure, in the process of discovering disease-relevant microbial consortia by whole metagenome sequencing data.

The best-performing ML model in the random forest exhibited an AUROC of 0.959 (FIG. 14C). For the model, taxonomic similarity was measured by 'correlation' and clustering algorithm 'GMM' with parameters 'covariance=spherical' and 'Nclusters=48' was used to identify candidate microbial consortia (FIG. 14C).

Figure 15:
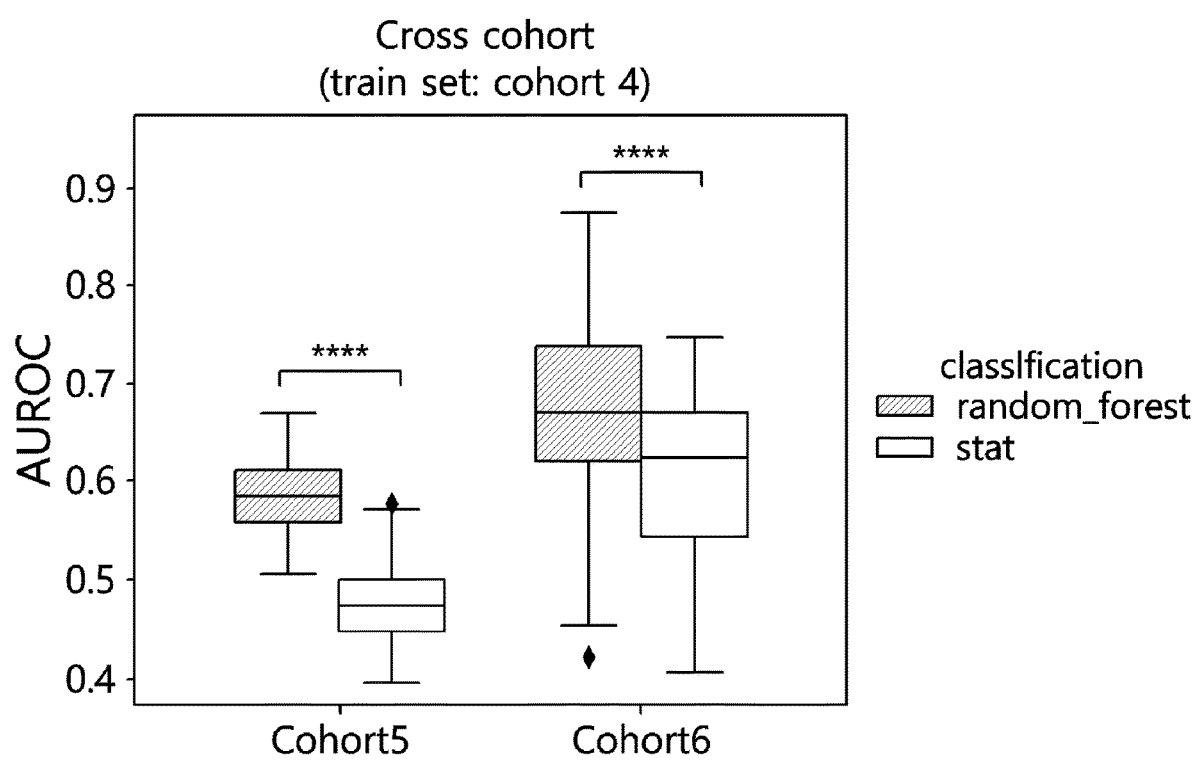
FIG. 15 shows a result of cross-cohort prediction of the best-performing ML algorithm compared to statistical-based approach, in the process of discovering disease-relevant microbial consortia by whole metagenome sequencing data.

The present inventors further validated that the best-performing ML algorithm is generally able to predict disease status of obese individuals. In cross-cohort prediction, the best-performing ML algorithm can predict disease status better than that of statistical-based approach in two independent datasets (FIG. 15).

5-2. Discovery of Obesity-Relevant Microbial Consortium

Figure 16A:
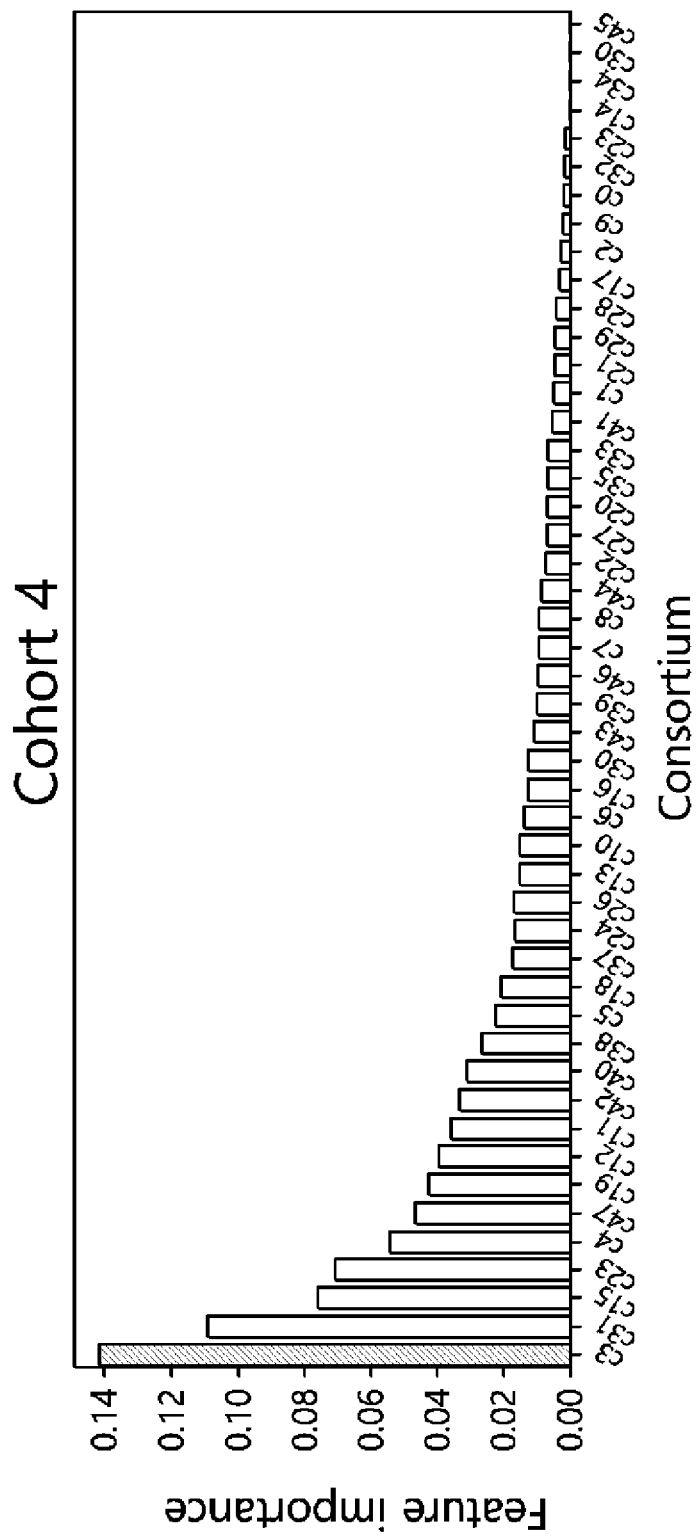
FIG. 16A shows a feature importance of the best-performing ML model according to the present disclosure in cohort 4, in the process of discovering disease(obesity)-relevant microbial consortia by whole metagenome sequencing data.

The consortium labeled as C3 was identified as the most obesity-relevant microbial consortium. It exhibited the highest feature importance (FIG. 16A), and C3 demonstrated a higher abundance distribution in the obesity group(median=0.012) compared to the healthy group (median=0.004) ($P=2.55 \times 10^{-12}$)(FIG. 16B).

Figure 17A:
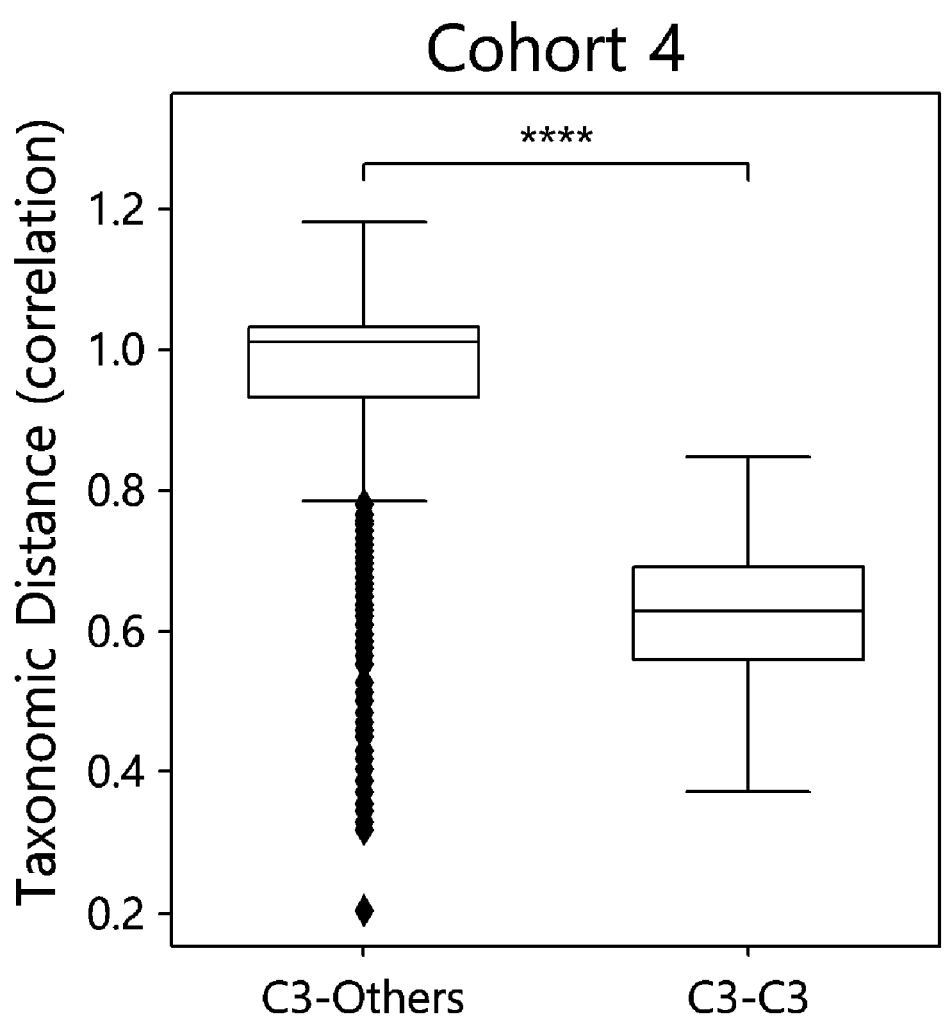
FIG. 17A shows a distance of microbial members in the disease(obesity)-relevant microbial consortium, in the process of discovering disease(obesity)-relevant microbial consortia by whole metagenome sequencing data.
Figure 17B:
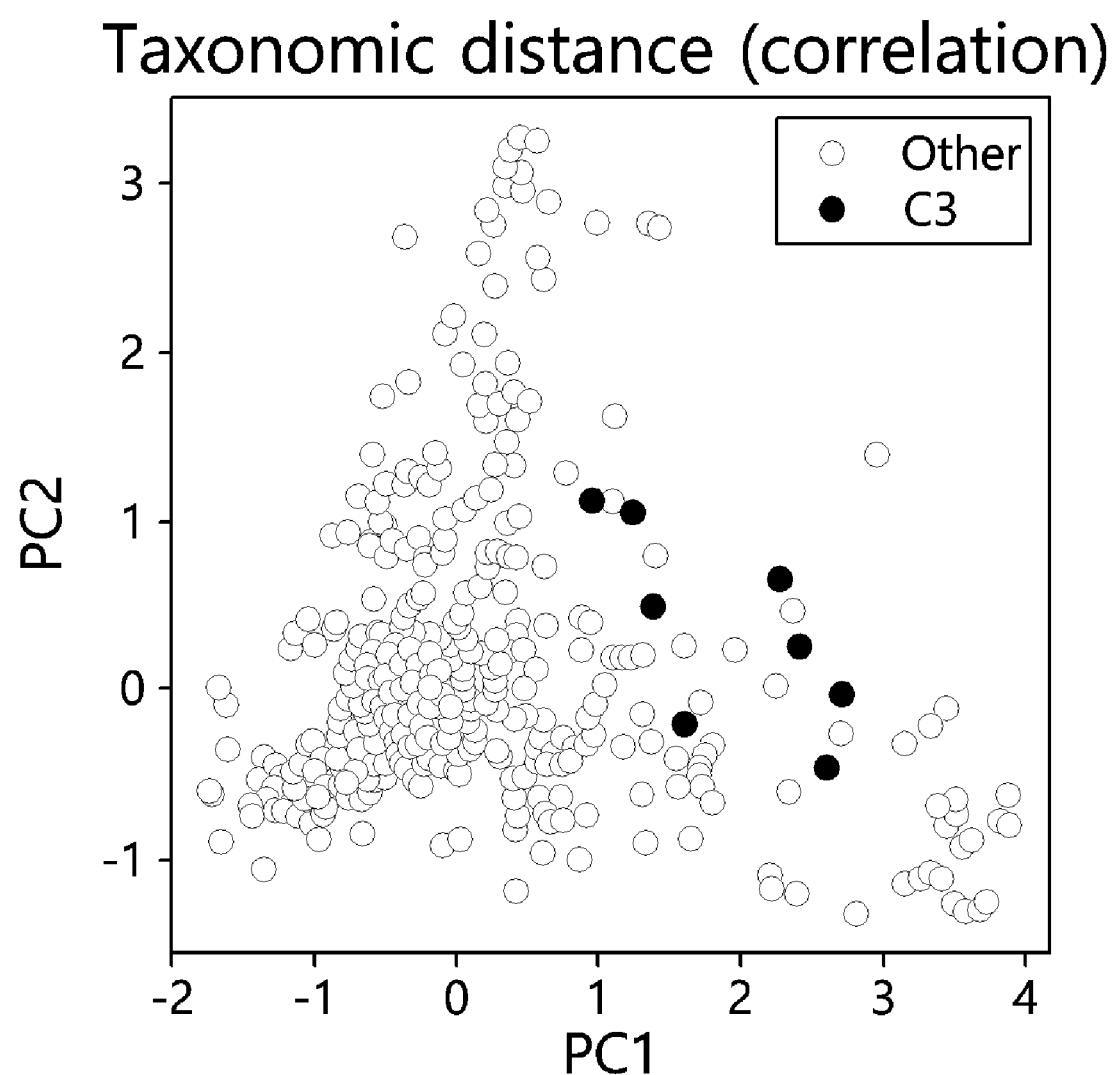
FIG. 17B is a PCA plot of FIG. 17A.
Figure 18:
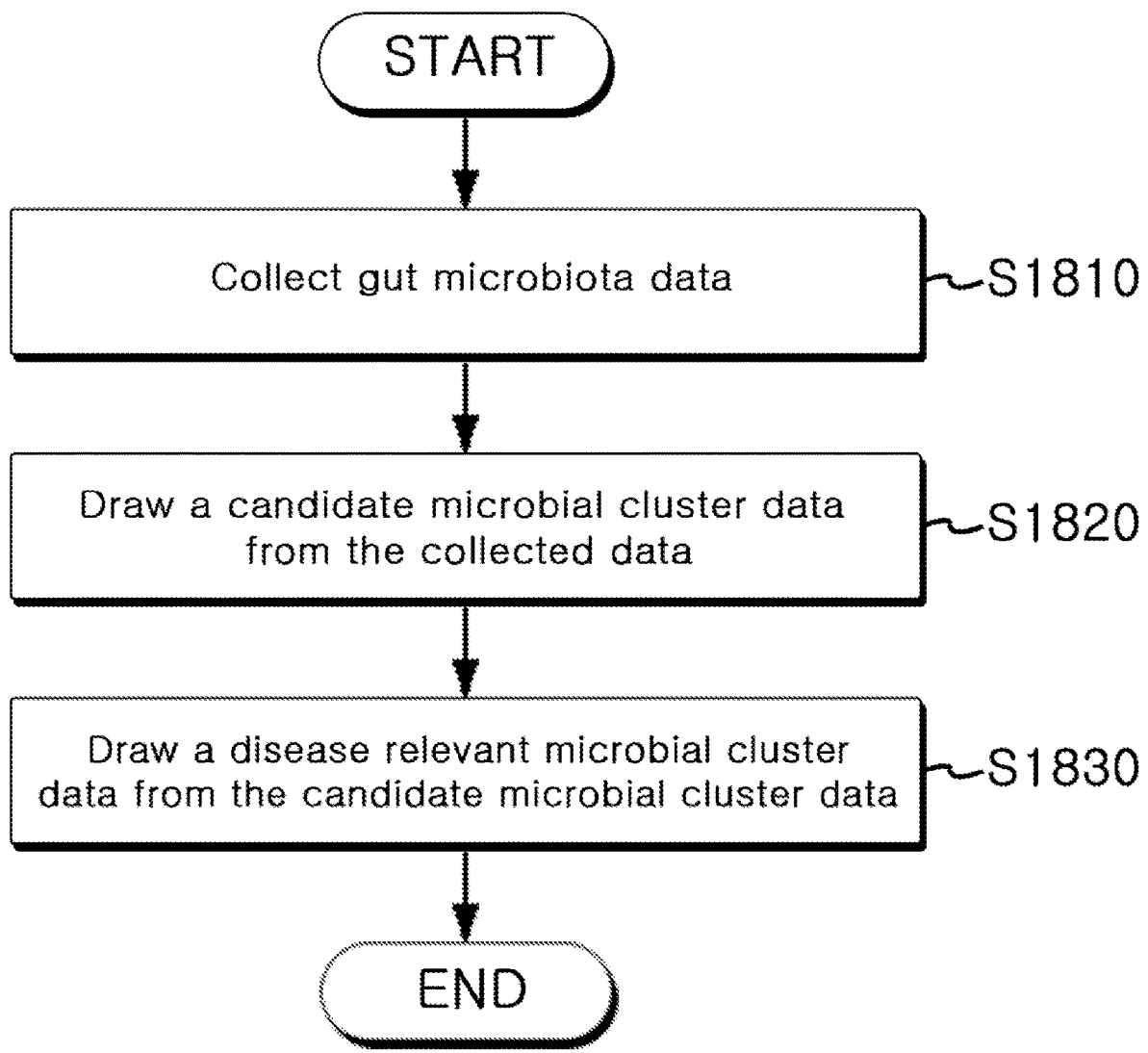
FIG. 18 is a flowchart of the method according to the present disclosure.
Figure 19:
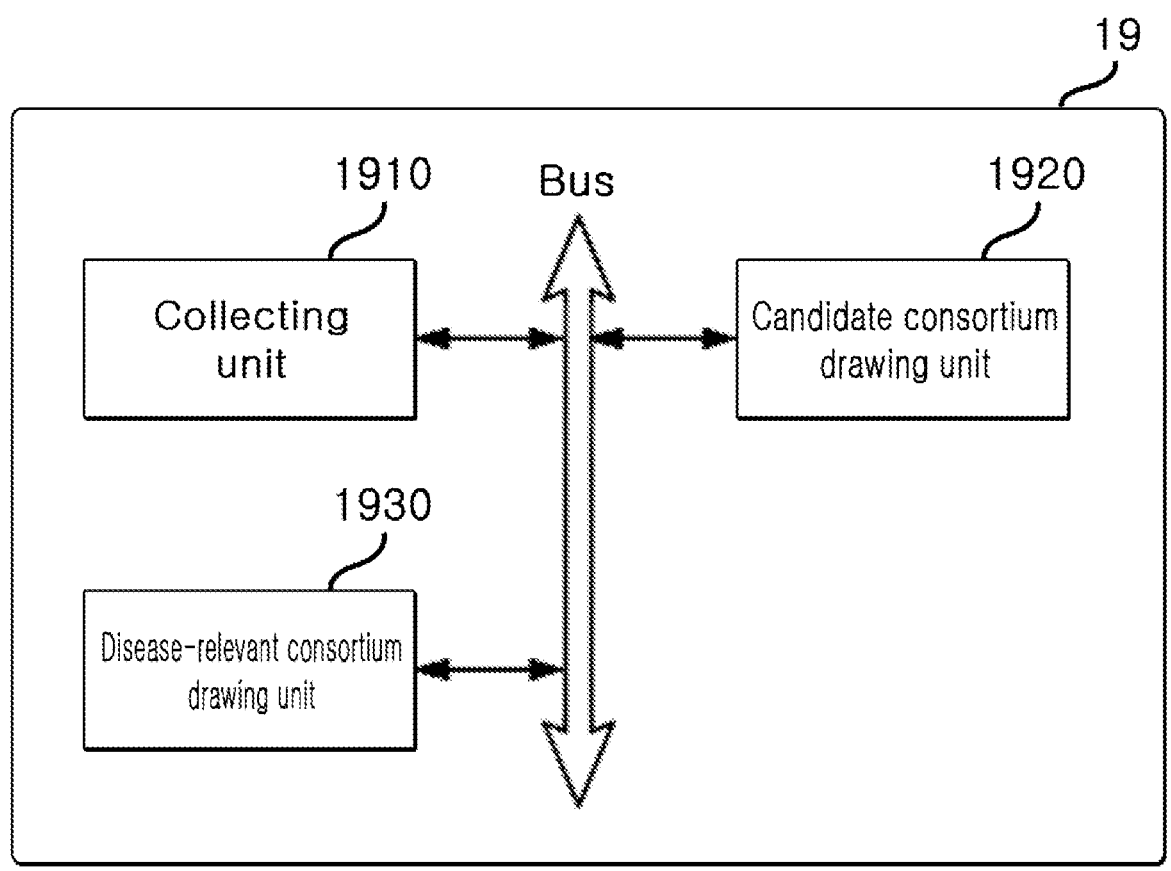
FIG. 19 is a block diagram of the device according to the present disclosure.

The present inventors confirmed that microbial members of C3 were closely related with each other. The distance between internal members of C3 was found to be closer than the distance between the members of consortium C3 and other consortium members (FIG. 17A). The distance was visualized using PCA plots (FIG. 17B).

The validity of the identified obesity-relevant microbe consortium (C3) was further supported by previous research. The internal members of consortium C3 included several species such as *Collinsella aerofaciens*, *Eubacterium hallii*, and *Dorea longicatena*(Table 8). Liu et al.[15] reported an increase in *Collinsella aerofaciens*, *Eubacterium haliji*, and *Dorea longicatena* within the obesity groups. Additionally, C3 included *Streptococcus salivarius*, *Blautia obeum*, *Solobacterium moorei*, and so on, which were previously not reported. These findings suggest that our pipeline has the potential to identify both previously reported and novel members of the obesity-relevant consortium, indicating its comprehensive capability.

TABLE 8

Member of the disease relevant microbial consortium of consortium C3

| Phylum | Class | Order | Family | Genus | Species |
|---|---|---|---|---|---|
| Actinobacteria | Coriobacteria | Coriobacteriales | Coriobacteriaceae | Collinsella | *Collinsella aerofaciens |
| Firmicutes | Bacilli | Lactobacilles | Streptococcaceae | Streptococcus | Streptococcus salivarius Streptococcus vestibularis Streptococcus anginosus group |
|  | Clostridia | Clostridiales | Eubacteriaceae | Eubacterium | *Eubacterium hallii |
|  |  |  | Lachnospiraceae | Blautia | Blautia obeum |
|  |  |  |  | Dorea | *Dorea longicatena |
|  | Erysipelotrichia | Erysipelotrichales | Erysipelotrichaceae | Solobacterium | Solobacterium moorei |

*mentioned in the literature

The present disclosure successfully identified disease-relevant microbial consortia across various diseases and sequencing platforms, indicating its versatility and applicability in diverse scenarios. This highlights the potential for the pipeline to be employed in comprehensive settings.

Furthermore, the present disclosure demonstrates the capability to discover novel microbial members within a disease-relevant consortium. This not only expands our understanding of the microbial communities associated with diseases but also aids in the development of strategies for discovering new microbes that could potentially alleviate diseases. Thus, the developed pipeline contributes to advancing our knowledge of disease-associated microbial communities and supports the exploration of new avenues for disease management.

REFERENCE

1) Gupta V K et al., A predictive index for health status using species-level gut microbiome profiling, Nature Communications, 2020, 11, 4635
2) Liu R et al., Gut microbiome and serum metabolome alterations in obesity and after weight-loss intervention, Nature Medicine, 2017, 23, 859-868
3) Le Chatelier E et al., Richness of human gut microbiome correlates with metabolic markers, Nature, 2013, 500, 541-546
4) Jie Z et al., The gut microbiome in atherosclerotic cardiovascular disease, Nature Communications, 2017, 8, 845
5) Beghini F et al., Integrating taxonomic, functional, and strain-level profiling of diverse microbial communities with bioBakery 3, eLife, 2021
6) 14. Peters B A et al., A taxonomic signature of obesity in a large study of American adults, Nature scientific reports, 2018, 8, 9749
7) Martinez E et al., Gut Microbiota Composition Associated with Clostridioides difficile Colonization and Infection, Pathogens, 2022, 11(7), 781
8) Scher J U et al., Expansion of intestinal *Prevotella copri* correlates with enhanced susceptibility to arthritis, Elife, 2013, 2, e01202
9) Xu et al., Interactions between Gut Microbiota and Immunomodulatory Cells in Rheumatoid Arthritis, Mediators of Inflammation, 2020
10) Zhao T et al., Gut microbiota and rheumatoid arthritis: From pathogenesis to novel therapeutic opportunities, Frontiers Immunology, 2022, 13, 1007165
11) Liu R et al., Gut microbiome and serum metabolome alterations in obesity and after weight-loss intervention, Nature Medicine, 2017, 23, 859-868
12) Schubert A M et al., Microbiome Data Distinguish Patients with *Clostridium difficile* Infection and Non-*C. difficile*-Associated Diarrhea from Healthy Controls, mBio, 2014, 5(3), e01021-14
13) Scher J U et al., Expansion of intestinal *Prevotella copri* correlates with enhanced susceptibility to arthritis, Elife, 2013, 2, e01202
14) Liu R et al., Gut microbiome and serum metabolome alterations in obesity and after weight-loss intervention, Nature Medicine, 2017, 23, 859-868
15) Le Chatelier E et al., Richness of human gut microbiome correlates with metabolic markers, Nature, 2013, 500, 541-546
16) Jie Z et al., The gut microbiome in atherosclerotic cardiovascular disease, Nature Communications, 2017, 8, 845

DESCRIPTION OF REFERENCE CHARACTERS

19: Device for Drawing Disease-relevant Microbial Consortia.
1910: Collecting Unit
1920: Candidate Consortium Drawing Unit
1930: Disease-relevant Consortium Drawing Unit

We claim:

1. A method of drawing microbial cluster data using a machine learning model by a computing device, the method comprising:
   (1) a process of collecting gut microbiota data to draw a candidate microbial cluster data from the collected gut microbiota data; and
   (2) a process of drawing a disease relevant microbial cluster data from the candidate microbial cluster data,
   wherein the process of collecting the gut microbiota data comprises:
   a process of calculating pairwise taxonomic similarity of the gut microbiota data;
   a process of clustering the gut microbiota data to generate primary cluster data based on the pairwise taxonomic similarity; and
   a process of drawing the candidate microbial cluster data through quality control,
   wherein the process of drawing the disease relevant microbial cluster data comprises:
   a process of splitting the candidate microbial cluster data into a training set and a test set;
   a process of training the machine learning model with the training set;
   a process of identifying an algorithm with a highest median predictive performance and selecting the machine learning model with the highest predictive performance among from machine learning models using the algorithm; and
   a process of drawing the disease relevant microbial cluster data using the selected machine learning model.

2. The method according to claim 1,
   wherein, when the disease relevant microbial cluster data is obtained by a 16S rRNA amplicon sequencing data and is associated with an obesity, the selected machine learning model identifies obesity-relevant microbial consortium genera including one or more of genera from Incertae Sedis XIII, *Oscillibacter* and *Sporobacter* from Ruminococcaceae, and *Desulfovibrio* from Desulfovibrionaceae, and a patient is treated with a probiotics or a live biotherapeutic product (LBP) containing the obesity-relevant microbial consortium genera,
   wherein, when the disease relevant microbial cluster data is obtained by the 16S rRNA amplicon sequencing data and is associated with a clostridioides difficile infection (CDI), the selected machine learning model identifies CDI-relevant microbial consortium genera including one or more of *Anaerovorax* from Incertae Sedis XIII, *Syntrophococcus* and incertae sedis from Lachnospiraceae, *Clostridium* III, *Clostridium* IV, and *Ruminococcus* from Ruminococcaceae, and *Acholeplasma* from Acholeplasmataceae, and the patient is treated with a probiotics or an LBP containing the CDI-relevant microbial consortium genera, and wherein, when the disease relevant microbial cluster data is obtained by the 16S rRNA amplicon sequencing data and is associated with a rheumatoid arthritis (RA), the selected machine learning model identifies RA-relevant microbial consortium genera including one or more of *Prevotella* from Prevotellaceae, *Streptococcus* from Streptococcaceae, *Clostridium* sensu stricto from Clostridiaceae 1, and Anaerotruncus, *Clostridium* IV, and *Pseudoflavonifractor* from Ruminococcaceae, and Dilaister and *Veillonella* frome Veillonellaceae, and the patient is treated with a probiotics or an LBP containing the RA-relevant microbial consortium genera.

3. The method according to claim 1,
wherein the clustering is conducted using an unsupervised learning algorithm.

4. The method according to claim 3,
wherein the unsupervised learning algorithm includes one or more of hierarchical clustering, K-means clustering, and Gaussian mixture model.

5. The method according to claim 1,
wherein the quality control is to filter out cluster data including either one or two microbes, or cluster data containing more than half of total microbes in the gut microbiota data.

6. The method according to claim 1,
wherein, when the disease relevant microbial cluster is obtained by a whole metagenome sequencing data and is associated with the obesity, the selected machine learning model identifies obesity-relevant microbial consortium species including *Collinsella aerofaciens* from *Collinsella, Streptococcus salivarius, Streptococcus vestibularis*, and *Streptococcus anginosus* from Streptococcaceae, *Eubacterium hallii* from *Eubacterium, Blautia obeum* from *Blautia, Dorea longicatena* from *Dorea*, and *Solobacterium moorei* from *Solobacterium*, and a patient is treated with a probiotics or an LBP containing the obesity-relevant microbial consortium species.

7. The method of claim 1,
wherein the training set and the test set are split using Monte Carlo Random sampling.

8. The method of claim 1,
wherein the algorithm is a supervised learning algorithm.

9. The method of claim 8,
wherein the supervised learning algorithm includes one or more of logistic regression, Naïve Bayes, random forest, and support vector machines (SVM).

10. The method of claim 1,
wherein the disease relevant microbial cluster data is drawn as a cluster data with the highest feature importance among from the candidate microbial cluster data used in the selected machine learning model.

11. A device of drawing microbial cluster data using a machine learning model, the device comprising:
at least one processor; and
at least one memory for storing a computer program code, wherein the at least one processor, when the computer program code is executed, is:
configured to collect gut microbiota data;
configured to draw a candidate microbial cluster data from the collected gut microbiota data; and
configured to draw a disease relevant microbial cluster data from the candidate microbial cluster data,
wherein the at least one processor is further configured to:
calculate pairwise taxonomic similarity of the gut microbiota data;
cluster the gut microbiota data to generate primary cluster data based on the pairwise taxonomic similarity; and
draw the candidate microbial cluster data through quality control,
wherein the at least one processor is further configure to:
split the candidate microbial cluster data into a training set and a test set;
train the machine learning model using an algorithm with the training set;
identify the algorithm with a highest median predictive performance and select the machine learning model with the highest predictive performance among from machine learning models using the algorithm; and
draw the disease relevant microbial cluster data using the selected machine learning model.

12. The device of claim 11,
wherein, when the disease relevant microbial cluster data is obtained by a 16S rRNA amplicon sequencing data and is associated with an obesity, the selected machine learning model identifies obesity-relevant microbial consortium genera including one or more of genera from Incertae Sedis XIII, *Oscillibacter* and *Sporobacter* from Ruminococcaceae, and *Desulfovibrio* from Desulfovibrionaceae, and a patient is treated with a probiotics or a live biotherapeutic product (LBP) containing the obesity-relevant microbial consortium genera,
wherein, when the disease relevant microbial cluster data is obtained by the 16S rRNA amplicon sequencing data and is associated with a clostridioides difficile infection (CDI), the selected machine learning model identifies CDI-relevant microbial consortium genera including one or more of *Anaerovorax* from Incertae Sedis XIII, *Syntrophococcus* and incertae sedis from Lachnospiraceae, *Clostridium* III, *Clostridium* IV, and *Ruminococcus* from Ruminococcaceae, and *Acholeplasma* from Acholeplasmataceae, and the patient is treated with a probiotics or an LBP containing the CDI-relevant microbial consortium genera,
wherein, when the disease relevant microbial cluster data is obtained by the 16S rRNA amplicon sequencing data and is associated with a rheumatoid arthritis (RA), the selected machine learning model identifies RA-relevant microbial consortium genera including one or more of *Prevotella* from Prevotellaceae, *Streptococcus* from Streptococcaceae, *Clostridium* sensu stricto from Clostridiaceae 1, and Anaerotruncus, *Clostridium* IV, and *Pseudoflavonifractor* from Ruminococcaceae, and Dilaister and *Veillonella* frome Veillonellaceae, and the patient is treated with a probiotics or an LBP containing the RA-relevant microbial consortium genera.

13. The device of claim 11,
wherein the clustering is conducted using an unsupervised learning algorithm.

14. The device of claim 13,
wherein the unsupervised learning algorithm includes one or more of hierarchical clustering, K-means clustering, and Gaussian mixture model.

15. The device of claim 11,
wherein the quality control is to filter out a cluster data including either one or two microbes, or cluster data containing more than half of total microbes in the gut microbiota data.

16. The device of claim 11,
wherein, when the disease relevant microbial cluster is obtained by a whole metagenome sequencing data and is associated with the obesity, the selected machine learning model identifies obesity-relevant microbial consortium species including *Collinsella* aerofaciens from *Collinsella, Streptococcus salivarius, Streptococcus vestibularis*, and *Streptococcus anginosus* from Streptococcaceae, *Eubacterium hallii* from *Eubacterium, Blautia obeum* from *Blautia, Dorea longicatena* from *Dorea*, and *Solobacterium moorei* from *Solobacterium*, and a patient is treated with a probiotics or an LBP containing the obesity-relevant microbial consortium species.

17. The device of claim 11,
wherein the training set and the test set are split using Monte Carlo Random sampling.

18. The device of claim 11,
wherein the algorithm is a supervised learning algorithm.

19. The device of claim 18,
wherein the supervised learning algorithm includes one or more of logistic regression, Naïve Bayes, random forest, and support vector machines (SVM).

20. The device of claim 11,
wherein the disease relevant microbial cluster data is drawn as a cluster data with the highest feature importance among from the candidate microbial cluster data used in the selected machine learning model.

21. The method of claim 1,
wherein, in the process of the splitting of the candidate microbial cluster data, the candidate microbial cluster data is split into the training set and the test set in an 8:2 ratio through a Monte Carlo sampling, and the Monte Carlo sampling is performed 5 to 50 times.

22. The device of claim 11,
wherein the at least one processor is configured to split the candidate microbial cluster data into the training set and the test set in an 8:2 ratio through a Monte Carlo sampling, and the Monte Carlo sampling is performed 5 to 50 times.

* * * * *